(12) United States Patent
Eldeeb et al.

(10) Patent No.: US 9,323,521 B2
(45) Date of Patent: Apr. 26, 2016

(54) DECIMAL FLOATING-POINT PROCESSOR

(71) Applicant: SilMinds, LLC., Cairo (EG)

(72) Inventors: Tarek Eldeeb, Cairo (EG); Hossam Aly Hassan Fahmy, Cairo (EG); Amr Elhosiny, Cairo (EG); Mahmoud Y. Hassan, Cairo (EG); Yasmen Aly, Cairo (EG); Ramy Raafat, Cairo (EG)

(73) Assignee: SilMinds, Inc., Cairo (EG)

( * ) Notice: Subject to any disclaimer, the term of this patent is extended or adjusted under 35 U.S.C. 154(b) by 612 days.

(21) Appl. No.: 13/720,656

(22) Filed: Dec. 19, 2012

(65) Prior Publication Data

US 2013/0159682 A1 Jun. 20, 2013

Related U.S. Application Data

(60) Provisional application No. 61/577,590, filed on Dec. 19, 2011.

(51) Int. Cl.
*G06F 9/30* (2006.01)
*G06F 9/38* (2006.01)
*G06F 9/345* (2006.01)

(52) U.S. Cl.
CPC ............ *G06F 9/3001* (2013.01); *G06F 9/3013* (2013.01); *G06F 9/30109* (2013.01); *G06F 9/30141* (2013.01); *G06F 9/345* (2013.01); *G06F 9/3824* (2013.01)

(58) Field of Classification Search
CPC . G06F 9/3001; G06F 9/30036; G06F 9/3885; G06F 9/30014; G06F 9/3836; G06F 9/30109; G06F 9/3013; G06F 9/30141; G06F 9/345; G06F 9/3824
See application file for complete search history.

(56) References Cited

U.S. PATENT DOCUMENTS

| | | | | |
|---|---|---|---|---|
| 4,760,518 | A * | 7/1988 | Potash et al. | 710/107 |
| 2007/0277022 | A1 * | 11/2007 | Bohizic | G06F 11/2226 712/222 |
| 2010/0321579 | A1 * | 12/2010 | Ahmad et al. | 348/607 |

OTHER PUBLICATIONS

Buchholz, W., "Fingers or Fists? (The Choice of Decimal or Binary Representation)", Communications of the ACM, Dec. 1959, 9 pages.
"IEEE Standard for Floating-Point Arithmetic", IEEE Computer Society, Jun. 12, 2008, 70 pages.
Cowlishaw, M.F., "Decimal Floating-Point:Algorism for Computers", Proceedings of the 16th IEEE Symposium on Computer Arithmetic (ARITH'03), Jun. 15, 2003, 8 pages.
"The decNumber C Library", IBM Corporation, Jan. 23, 2010, 95 pages.

(Continued)

*Primary Examiner* — Farley Abad
(74) *Attorney, Agent, or Firm* — Osha Liang LLP

(57) ABSTRACT

A method for operating a decimal-floating point (DFP) processor. The method includes identifying a first op-code requiring read access to a first plurality of DFP operands in a vector register of the DFP processor; granting read access from a first port of the vector register to a first execution unit of the DFP processor selected to execute the first op-code; initializing a read pointer of the first port; reading out, from the first port and based on the read pointer, a first DFP operand of the plurality of DFP operands in response to a read request from the first execution unit; and adjusting the read pointer of the first port in response to reading out the first DFP operand.

14 Claims, 34 Drawing Sheets

(56) References Cited

OTHER PUBLICATIONS

Cornea, M., "A Software Implementation of the IEEE 754R Decimal Floating-Point Arithmetic using the Binary Encoding Format", 18th Symposium on Computer Arithmetic (ARITH'07), Nov. 17, 2008, 9 pages.

Raafat, R., et al. "A Decimal Fully Parallel and Pipelined Floating Point Multiplier", IEEE Systems and Computers, 2008 42nd Asilomar Conference on Signals, Oct. 26-29, 2008, 5 pages.

Wang, L., et al., "Decimal Floating-Point Division Using Newton-Raphson Iteration", Proceedings of the 15th IEEE International Conference on Application-Specific Systems, Architectures and Processors (ASAP'04), Sep. 27-29, 2004, 12 pages.

Fahmy, H. A. H., "Decimal Floating Point for Future Processors", 2010 International Corporation on Microelectronics (ICM), Dec. 19-22, 2010, 4 pages.

Wang, L., "Benchmarks and Performance Analysis of Decimal Floating-Point Applications" ICCD 2007, 25th International Conference on Computer Design, Oct. 7-10, 2007, 7 pages.

Fahmy, H.A.H., et al., "Energy and Delay Improvement via Decimal Floating Point Units", ARITH 2009, 19th IEEE Symposium on Computer Arithmetic, Jun. 8-10, 2009, 4 pages.

Samy, R., et al., "A Decimal Floating-Point Fused-Multiply-Add Unit", Architectures and Processors (ASAP), 2011 IEEE Interational Conference on Application-Specific Systems, Sep. 11-14, 2011, 4 pages.

Russinoff, D. M., "A Mechanically Checked Proof of IEEE Compliance of the Floating Point Multiplication, Division and Square Root Algorithms of the AMD-K7™ Processor", London Mathematical Society, Dec. 23, 1998, 53 pages.

Kern, C., et al., "Formal Verification in Hardware Design: A Survey", ACM Transactions on Design Automation of Electronic Systems (TODAES), Apr. 1999, 71 pages.

Sayed-Ahmed, A., et al., "Three Engines to Solve Verification Constraints of Decimal Floating-Point Operation", Systems and Computers (ASILOMAR), 2010 Conference Record of the Forty Fourth Asilomar Conference on Signals, Nov. 7-10, 2010, 5 pages.

Vazquez, A., et al., "A New Family of High-Performance Parallel Decimal Multipliers", ARITH'07. 18th IEEE Symposium on Computer Arithmetic, Jun. 25-27, 2007, 10 pages.

Schwarz, E.M., et al. "Decimal Floating-Point Support on the IBM System z10 Processor", IBM Journal of Research and Development, vol. 53, Issue 1, Jan. 2009, 11 pages.

Wang, L., et al., "Hardware Designs for Decimal Floating-Point Addition and Related Operations", IEEE Transactions on Computers, vol. 58 No. 3, Mar. 1, 2009, 14 pages.

\* cited by examiner

| Dec_Busy_W | in | Asserted by the decode to grant write access to port B. Could not be asserted by the decode unless the vector Busy_W flag is low. |
|---|---|---|
| Dec_Busy_A | in | Asserted by the decode to grant read access from port A. Could not be asserted by the decode unless Busy_A flag is low. |
| Dec_Busy_B | in | Asserted by the decode to grant read access from port B. Busy_W and Busy_B should be low. |
| RstRd_a | in | Restore port A from busy state to idle state. Asserted by the executer which has been given the read access grant to port A. |
| RstRd_b | in | Restore port B from busy state (busy read or busy write) to idle state. Asserted by the executer which has been given the read/write access grant to port B |
| wrreq_b_in | in | write request from executer that has been given the write access grant. |
| Ld_Address_A | in | asserted by the index&shift executer when indexing from port A or initializing port A pointer for shift up or down. |
| Ld_Address_B | in | asserted by the index&shift executer when indexing from port B, indexing to port B or initializing port B pointer in case of shift down. Asserted also by the copy executer(s) in case of copy under condition to increment the wirte pointer. |
| Wr_Size | in | number of operands to be written on the vector, set by the executer given the write access. |
| Address_B | in | Set by the index&shift executer. Holds the pointer value corresponding to the element to be read or written during indexing. Holds the shift between read and write pointers in case of shift. |
| wr_data | in | Operands to be written on the vector register. Result of the core given the write access grant. |
| rdreq_a_in | in | read request to port A from executer that has been given the read access grant to port A. |
| rdreq_b_in | in | read request to port B from executer that has been given the read access grant to port B. |
| Shift_Index_2Mem | in | Set by the index&shift executer. Set high in case of shift or indexing to port B. Set low in case of indexing from port A or B. Set low as long as index&shift is not busy. Set high or low for one clock cycle when the index&shift starts operation, otherwise it's set low. |
| rd_data_a | out | Read data output from port A. |

FIG. 4A

| | | |
|---|---|---|
| rd_data_b | out | Read data output from port B. |
| Finish_a | out | Read finish flag for port A, asserted when all operands in the vector are read by the executer from port A. When this flag is detected high by the executer it set the rdreq_a_in low. |
| Finish_b | out | Read finish flag for port B, asserted when all operands in the vector are read by the executer from port B. When this flag is detected high by the executer it set the rdreq_b_in low. |
| wr_finish | out | Write finish flag asserted by the memory when the number elements written equal to the Wr_Size. When detected high by the executer given the write access it stops writing (sets the wrreq_b_in low). |
| WrWait | out | Asserted in the WAR2 state to prevent the writing core from overwriting a data that has not been read yet by the core reading from port A. When WrWait is asserted the writing core stop sending write requests to the memory. |
| Data_valid_b | out | Set high when there is a valid data has been written to the memory. Allows and executer to read from port B. Data_valid_b is initially low, once data is written to the memory and the memory goes from write busy to idle state Data_valid_b goes high. |
| Data_valid_a | out | Set high to indicate valid data in the memory could be read or has not been read yet from port A. Data_valid_a control depends on the state of the state machine. This will be explained later. |
| Busy_W | out | Set high by the memory when write access grant is given to an executer. |
| Busy_A | out | Set high by the memory when read access grant on port A is given to an executer. |
| Busy_B | out | Set high by the memory when read access grant on port B is given to an executer. |
| sData_valid_a_U | signal | controls data valid for port A in the RAW state. |
| sWrWait | signal | Controls write wait by comparing read and write address in all cases. |
| sLast_write | signal | Asserted for a single clock cycle when writing the last word. Used to set the wr_finish output. Generated by comparing write pointer to write size in normal mode of operation or comparing it to zero in case of shift down. Used by state machine to indicate finish of write operation. |

FIG. 4B

| | | |
|---|---|---|
| sFinish_a | signal | Asserted for a single clock cycle when reading the last element from port A. Reading last element is indicated when read pointer equals zero in case of shift down or equals the read size in the rest of the cases. |
| sFinish_b | signal | Asserted for a single clock cycle when reading last element from port B. Reading last element is indicated when pointer B equals the write size. |
| vAdd_a_mux | signal | The address pointer to port A of the RAM. It's a multiplexer which selects the pointer between two values, external pointer in case of index or the internal address controlled by the state machine. |
| vAdd_b_mux | signal | The address pointer to port B of the RAM. It's a multiplexer which selects the pointer between two values, external pointer in case of index or the internal address controlled by the state machine. |
| sIncrWrPtr | signal | Asserted to increment Port B pointer. Port B pointer is incremented when either wrreq_b or rdreq_b is high. |
| sIncrRdPtr | signal | Asserted to increment Port A pointer. Port A pointer is incremented when rdreq_a is high. |
| vAdd_a_nx | signal | The output of the adder/subtractor that calculates the next value of Port A pointer. |
| vAdd_b_nx | signal | The output of the adder/subtractor that calculates the next value of Port B pointer. |
| wrreq_b | signal | Increment Port B pointer in case of write busy only. Controlled by wrreq_b_in and other signals. |
| sWrReq2Mem | signal | The write enable to the RAM. |
| rdreq_b | signal | Increment Port B pointer in case of reading from port B. In addition it's the read enable to port B of the RAM. |
| rdreq_a | signal | Increment Port A pointer in case of reading from port A. In addition it's the read enable to portA of the RAM. |
| sBusy_W | signal | Combinational busy write set by the state machine when write access is granted on port B. |
| rBusy_W | signal | Registered version of sBusy_W. It's ORed with Dec_Busy_W to form the Busy_W output to the decode stage. |
| sBusy_A | signal | Combinational busy read set by the state machine when write access is granted on port A. |
| rBusy_A | signal | Registered version of sBusy_A. It's ORed with Dec_Busy_A to form the Busy_A output to the decode stage. |

FIG. 4C

| | | |
|---|---|---|
| sBusy_B | signal | Combinational busy read set by the state machine when write access is granted on port B. |
| rBusy_B | signal | Registered version of sBusy_B. It's ORed with Dec_Busy_B to form the Busy_B output to the decode stage. |
| sShift_reg | signal | Register that hold the value of the port Shift_Index_2Mem at the configuration cycle. It's reseted to zero when sWrEnd is high. |
| sWrEnd | signal | Indicates end of write operation on the write port. Asserted either when RstRd_b or sLast_write are high during a busy write state of the memory. |
| sRdEnd_A | signal | Indicates end of read operation from port A either in normal operation, index or shift. It follows sFinish_a for normal operation and shift. It follows RstRd_a in case of copy vector to scalar reading the first element. In case of index it is asserted once the rdreq_a is detected while Ld_Address_A is high. |
| sRdEnd_B | signal | Indicates end of read operation from port B either in normal operation, index or shift. It follows sFinish_b for normal operation. It follows RstRd_b in case of copy vector to scalar reading the first element. In case of index it is asserted once the rdreq_b is detected while Ld_Address_B is high. |
| vRdSize_reg | signal | Register holding the read size in order to save the read size until read is finished on port A in the WAR2 state. It's compared to the read pointer to set the sFinish_a signal. It a registered version of vRdSize. |
| vRdSize | signal | Pre-registered read size set by the state machine. |
| vAdd_a | signal | The address pointer for port A set by the state machine. The state machine either resets the pointer when read is finished or it saves the old value of the address or it selects the next address value output from the corresponding adder/subtractor. |
| vAdd_b | signal | The address pointer for port B set by the state machine. The state machine either resets the pointer when read is finished or it saves the old value of the address or it selects the next address value output from the corresponding adder/subtractor. |

FIG. 4D

| sData_Valid_a | signal | Combinational version of the output Data_Valid_a. It's set by the state machine according to the present state and external inputs. Either the state machine either sets it high, sets it low or connects it to sData_Valid_a_U. It's initially zero. |
|---|---|---|
| sData_Valid_b | signal | Combinational version of the output Data_Valid_b. It's set by the state machine according to the present state and external inputs. In case of busy write states it's set low. It's set high once write operation is ended. It's initially zero. |
| sWrWaitSM | signal | Combinational write wait set by the state machine according to the present state. It's either set low for non-WAR states, set high in read_a_busy state preparing for any WAR or set by the sWrWait generated by pointer comparison in the WAR2 state. |
| pr_state | signal | The present state of the state machine. |
| nx_state | signal | The next state of the state machine. |
| RdStall_A | signal | Register asserted high once sFinish_a is detected. It's used to block any erroneous extra read request from the reading executer from port A. |
| RdStall_B | signal | Register asserted high once sFinish_b is detected. It's used to block any erroneous extra read request from the reading executer from port B. |
| WrStall | signal | Register asserted high once sLast_write is detected. It's used to block any erroneous extra write request from the writing executer. |
| vShiftMode_U | signal | The shift mode which directly follows the values of Ld_Address_A & Ld_Address_B coming from the executer(s). |
| sShiftDown | signal | Asserted high when sShiftDown is "11" and sShift_reg is high (in case of memory is working in the shift down mode). |
| vShiftMode_reg | signal | Holds the shift mode to "11" for the memory to function correctly in the interval after the read is finished and write gets finished in case of shift down. |

FIG. 4E

| | | |
|---|---|---|
| vShiftMode | signal | ORing between vShiftMode_U and vShiftMode_reg. It's used by the address multiplexers vAdd_a_mux and vAdd_b_mux to select either external address or the state machine controlled address. In addition it's used to control sData_valid_a_U setting it low in the RAW state until the write operation due to shift down is finished. |
| sPtrCaptured_A | signal | Asserted in case of shift up or down after the address pointer for Port A is initialized depending on the external pointer from the shift executer. After it goes high the address pointer takes the adder/subtractor output. It's reseted when read operation has ended. |
| sPtrCaptured_B | signal | Asserted in case of shift down after the address pointer for Port B is initialized by the write size. After it goes high the address pointer takes the adder/subtractor output. It's reseted when write operation has ended. |
| sCin | signal | Carry in to the adder/subtractor that increments/decrements address B. Is set high in case of shift down to enable the adder/subtractor to work as a subtractor. It's set back to zero when writing is finished during the shift down operation. In other modes of operation it's always zero. |
| vOpA_B | signal | First operand to the adder/subtractor that increments/decrements address B. |
| vOpB_B | signal | Second operand to the adder/subtractor that increments/decrements address B. |
| sCin_A | signal | Carry in to the adder/subtractor that increments/decrements address A. Is set high in case of shift down to enable the adder/subtractor to work as a subtractor. It's set back to zero when reading from port A is finished during a shift down operation. In all other cases it's set low. |

FIG. 4F

| sShift_reg | Ld_Address_A | Ld_Address_B | action |
|---|---|---|---|
| 0 | 0 | 0 | Normal vector streaming |
| 0 | 0 | 1 | indexing from port B |
| 0 | 1 | 0 | indexing from port A |
| 0 | 1 | 1 | indexing from port A & copy under condition on port B |
| 1 | 0 | 0 | invalid |
| 1 | 0 | 1 | index to port B |
| 1 | 1 | 0 | shift up |
| 1 | 1 | 1 | shift down |

FIG. 9

| direction | Read Pointer | Write Pointer | Action |
|---|---|---|---|
| Up | $S_a$ | 0 | increment both to wr_size |
| Down | $wr\_size - S_a$ | $wr\_size$ | decrement both downto zero |

FIG. 12

| sPtrCaptured_A | vShiftMode | vOpA_A | vOpB_A | sCin_A |
|---|---|---|---|---|
| 0 | 11 | *wr_size* | not(vPtrFromIndex) | 1 |
| 1 | 11 | *vAdd_a_reg* | not(Zeros & sIncrRdPtr) | 1 |
| X | 10 | *vAdd_a_reg* | Zeros & sIncrRdPtr | 0 |

FIG. 13

| sPtrCaptured_B | vShiftMode | vOpA_B | vOpB_B | sCin |
|---|---|---|---|---|
| X | 11 | vAdd_b_reg | not(Zeros & sIncrWrPtr) | 1 |
| X | 10 | vAdd_b_reg | Zeros & sIncrWrPtr | 0 |

FIG. 14

| Original Vector | Shift Up by 3 | Shift Down by 4 |
|---|---|---|
| 3 | 12 | 0 |
| 5 | 33 | 0 |
| 8 | 63 | 0 |
| 12 | 0 | 0 |
| 33 | 0 | 3 |
| 63 | 0 | 5 |

FIG. 17

DECIMAL FLOATING-POINT PROCESSOR

CROSS-REFERENCE TO RELATED APPLICATIONS

This application claims priority under 35 U.S.C. §119(e) to U.S. Provisional Application Ser. No. 61/577,590, filed on Dec. 19, 2011, and is hereby incorporated by reference in its entirety.

BACKGROUND

Decimal arithmetic has a growing need in many commercial applications, financial applications, green energy applications, billing applications, and database systems where binary arithmetic is not sufficient because of the inexact mapping between some decimal and binary numbers. For example, the decimal number 0.1 does not have an exact binary representation. Moreover, decimal arithmetic is the norm of human calculations.

SUMMARY

In general, in one aspect, the invention relates to a method of operating a decimal floating-point (DFP) processor. The method comprises: identifying a first op-code requiring read access to a first plurality of DFP operands in a vector register of the DFP processor; granting read access from a first port of the vector register to a first execution unit of the DFP processor selected to execute the first op-code; initializing a read pointer of the first port; reading out, from the first port and based on the read pointer, a first DFP operand of the plurality of DFP operands in response to a read request from the first execution unit; and adjusting the read pointer of the first port in response to reading out the first DFP operand.

In general, in one aspect, the invention relates to a DFP processor. The DFP processor comprises a memory bank comprising a vector register and a scalar register; a plurality of execution units; a plurality of configurable operand buses operatively connecting the memory bank and the plurality of execution units; and a plurality of result buses operatively connecting the plurality of execution units and the memory bank.

Other aspects of the invention will be apparent from the following description and the appended claims.

BRIEF DESCRIPTION OF DRAWINGS

FIGS. 4A-4F show a table of signals controlling a vector register state machine and/or controlled by the vector register state machine in accordance with one or more embodiments of the invention.

FIG. 9 shows a table with shift, index, and copy conditions in accordance with one or more embodiments of the invention.

FIG. 12 shows a table with the initial values of read and write pointers for each of the shifting directions assuming a shift amount of Sa in accordance with one or more embodiments of the invention.

FIG. 13 shows a table with the inputs to the adder of port A in accordance with one or more embodiments of the invention.

FIG. 14 shows a table with inputs to the adder for port B in accordance with one or more embodiments of the invention.

FIG. 17 shows the shifting of a vector register in accordance with one or more embodiments of the invention.

DETAILED DESCRIPTION

Figure 1:
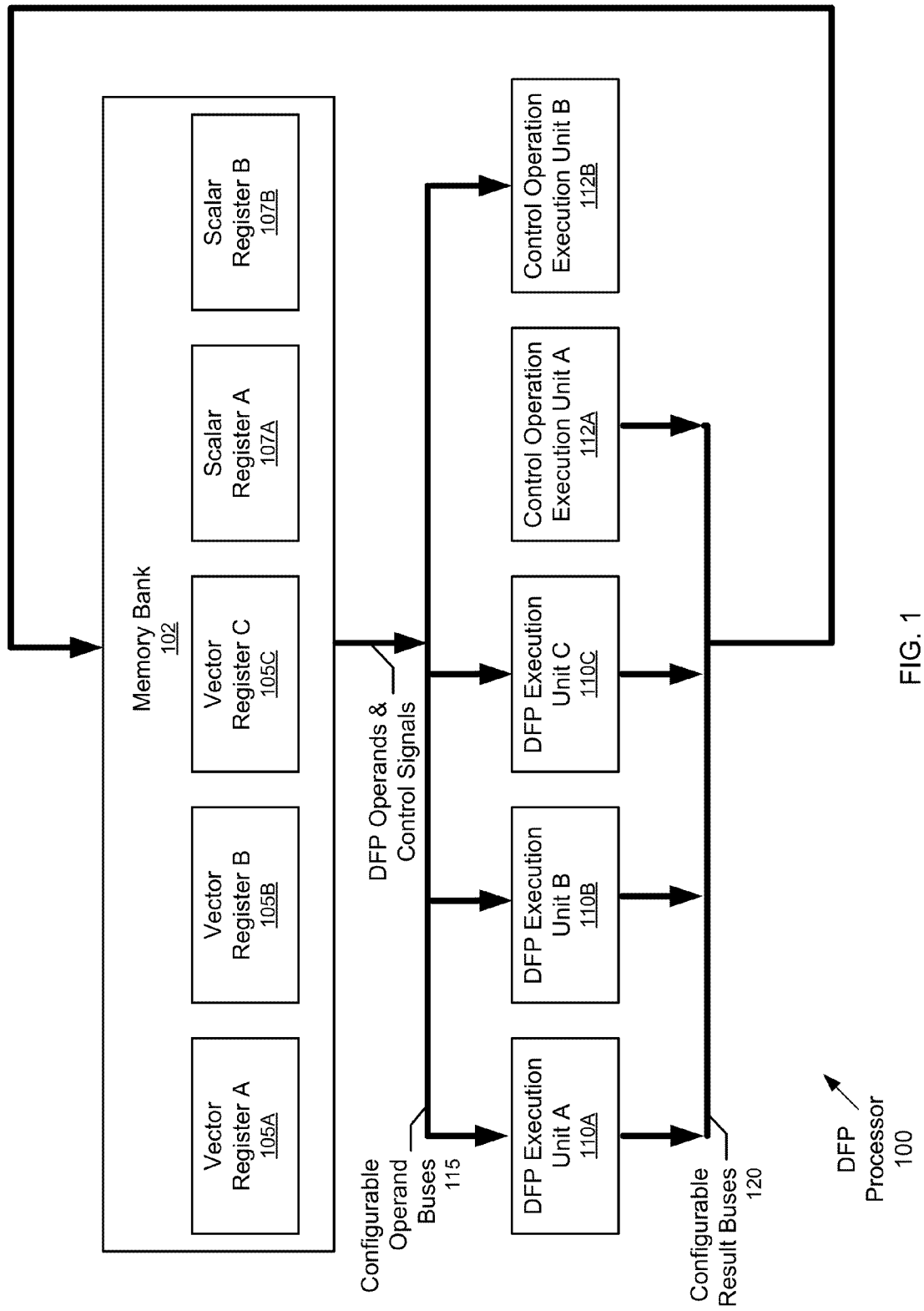
FIG. 1 shows a DFP processor in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a decimal floating-point (DFP) processor and a method of operating the DFP processor. The DFP processor includes a set of vector registers and a set of execution units that are configured to read and/or write DFP operands from/to the vector registers.

FIG. 1 shows a DFP processor (100) in accordance with one or more embodiments of the invention. As shown in FIG. 1, the DFP processor (100) includes a memory bank (102) operatively connected to one or more DFP execution units (i.e., DFP Execution Unit A (110A), DFP Execution Unit B (110B), DFP Execution Unit C (110C)) and one or more control operation execution units (i.e., Control Operation Execution Unit A (112A), Control Operation Execution Unit B (112B)). The DFP execution units (110A, 110B, 110C) and some of the control operation executions units (112B) read from the memory bank (102) by a number of configurable operand buses (115). Similarly, the DFP execution units (110A, 110B, 110C) and some of the control operation units (112C) write to the memory bank (102) by a number of configurable result buses (120).

In one or more embodiments of the invention, configurability in terms of runtime operation means that a certain operand bus is granted for a certain execution unit. At another instant, the bus is free and can be granted to another execution unit. Access to operand buses is granted the same way read access is granted to memory ports. A similar situation exists for result buses. In other words, access is granted for an execution unit on a result bus and freed when execution unit has finished its operation. Access is granted on a result bus the same way write access is granted to a write memory port.

In one or more embodiments of the invention, the term configurable in compile time maps to different embodiments, one embodiment may include 6 operand buses, another embodiment include 10 buses. Number of resources [resources=>DFP units, operand buses, result buses, number of vector registers, number of scalar registers] are parametrized. By changing these parameters, different embodiments of the processor may be generated.

In one or more embodiments of the invention, each DFP execution unit (110A, 110B, 110C) is configured to calculate a DFP mathematical operation (e.g., add, multiply, fused multiply-add (FMA), square-root, power, log, etc.) on DFP operands read from the memory bank (102). The DFP processor (100) may have any number of DFP execution units performing a specific DFP mathematical operation. A DFP execution unit (110A, 110B, 110C) uses control signals from a decoder (not shown) and the memory bank (102) to read/deliver DFP operands from the memory bank (102) to the DFP execution unit (110A, 110B, 110C). The result(s) of these DFP mathematical operands are stored in the memory bank (102).

In one or more embodiments of the invention, each control operation execution unit (112A, 112B) executes a non-arithmetic operation such as load, store, copy, initialize, etc. Due to the differences between these control operations, each control operation execution unit (112A, 112B) has its own logic. The DFP processor (100) may have any number control operation execution units (112A, 112B) and any number of a specific type of control operation execution unit. Some of the control operation execution units (e.g., load) are connected only to the result buses (120). Some of the control operation execution units (e.g., store) are connected only to the operand buses (115). Some of the control operation execution units are connected to both the operand buses (115) and the result buses (120).

Execution units (110A, 110B, 110C, 112A, 112B) in general serve three types of operations classified according to how they operate on DFP operands: (i) Read/Write Cores read DFP operands from the memory bank (102) and write back their results to the memory bank (102) (e.g., all DFP execution units are classified as read/write cores); (ii) Read Only Cores read DFP operands from the memory bank (102) and send them to system memory (main memory) (not shown) (i.e., store operation); and (iii) Write Only Cores bring DFP operands from system memory (main memory) and write them to the memory bank (102) (i.e., load operation).

There exists other cores that read data only from memory banks but do not store data to main memory. An example is the jump operation which is connected to integer unit operand buses to read function return address from an integer scalar register. The result from the jump is a new program counter (PC) to the fetch unit.

Still referring to FIG. 1, the DFP processor (100) includes a memory bank (102) with one or more vector registers (Vector Register A (105A), Vector Register B (105B), and Vector Register C (105C)) and one or more scalar registers (Scalar Register A (107A), Scalar Register B (107B)) storing DFP operands. Both the vector registers (105A, 105B, 105C) and the scalar registers are discussed below.

In one or more embodiments of the invention, the maximum number of vector or scalar registers is 32 directly addressable by the opcodes. The maximum number 32 comes from that the address field in the opcode is 5-bit wide. Addressing the register in the opcode is called register direct addressing. There another type of addressing available called register indirect addressing. Via register indirect addressing, the maximum number of vector or scalar registers could be much larger than the 32 limit.

The operands buses (115) is a set of giant multiplexers (OPMUXs) which route data and control signals from the memory bank (102) to the cores (110A, 110B, 110C, 112B). The number of these giant multiplexers is configurable and represents the number of buses. At the input of each core there is a set of small multiplexers (CoreInMuxs) each of them selects its data from one of the buses. The number of CoreIn-Muxs depends on the number of operands on which a core will operate.

In one or more embodiments of the invention, when an execution unit is configured to execute an opcode, the address of the bus granted for this execution unit is sent to the execution unit at the configuration instant (among another set of information sent to the execution unit during configuration cycle). The address of the bus is used by the CoreInMux to select which bus to use.

For each valid instruction the decoder checks for the number of operands the instruction execution needs and allocates number of buses equal to the needed number of operands. The allocated bus/buses stay reserved (busy) for the core executing the instruction until the core finishes reading from memory element(s) through the bus. When the reading process through the bus is finished the bus is freed and the decode can allocate it to a new instruction.

Operands Multiplexer is a giant multiplexer connecting all the outputs of register banks (e.g., 105A, 105B, 105C, 107A, 107B) to the input of the operands ports of arithmetic or control cores (110A, 110B, 110C, 112A, 112B). The selection lines of this MUXes is generated from the decode stage according to the sources addresses in the opcode. These Selection lines are separated into three sets: (Op Address, Op BNA and Op VNS). Op Address is the actual address of the source of data in the register banks either scalars or vectors. Op BNA determines which reading port of the Vector register that should be used now. Op VNS determines whether the data is an array of data or scalar data. The OpMux also chooses the right Data Valid and Data Finish signals to the arithmetic cores.

The memory bank (102) represents the data memory in the DFP processor architecture which is separated from the instruction memory represented by the program cache instantiated in the DFP processor and attached to the fetch stage. There are three types of data: scalar data; vector data; and conditional data.

Scalar Registers

The scalar data are stored in simple group of registers. Scalar quantity is a single operand of precision (e.g., decimal 64, decimal 128) defined by the ALUConfig generic. There is no limitation on the number of simultaneous read operations from a scalar register. A single write access on a scalar is allowed at a time to control write after write hazard. Write after write (WAW) hazard is controlled in decode via the write busy flag corresponding to each scalar register. When write access is granted on a scalar register, its busy flag is asserted to the decode stage to stall the coprocessor when WAW is detected. Read after write (RAW) is controlled by the data valid flag corresponding to each scalar register. When write access is granted on a scalar register: (i) the busy flag is set to one to stop WAW; and (ii) the data valid flag is set to zero to invalidate the old data (control RAW).

When data is written to the scalar register the busy flag is restored to zero and the data valid is set to one. An executer reading from the scalar monitors the data valid flag to be able to capture the scalar value.

Vector Registers

Array of operands are stored in the vector registers (105A, 105B, 105C).

Vector registers (105A, 105B, 105C) are implemented using the available block memory resources on the FPGA to save area and routing. The number of vector registers, their write depth and width are configurable (in compile time) via HDL generics defined at the coprocessor top entity. A vector register (105A, 105B, 105C) is implemented using a bidirectional dual port block ram. Port B is used as a read/write port, it can be used for one action at a time, either as a write or read port. Port A is used as a read only port. Each port has its own address pointer.

Figure 2:
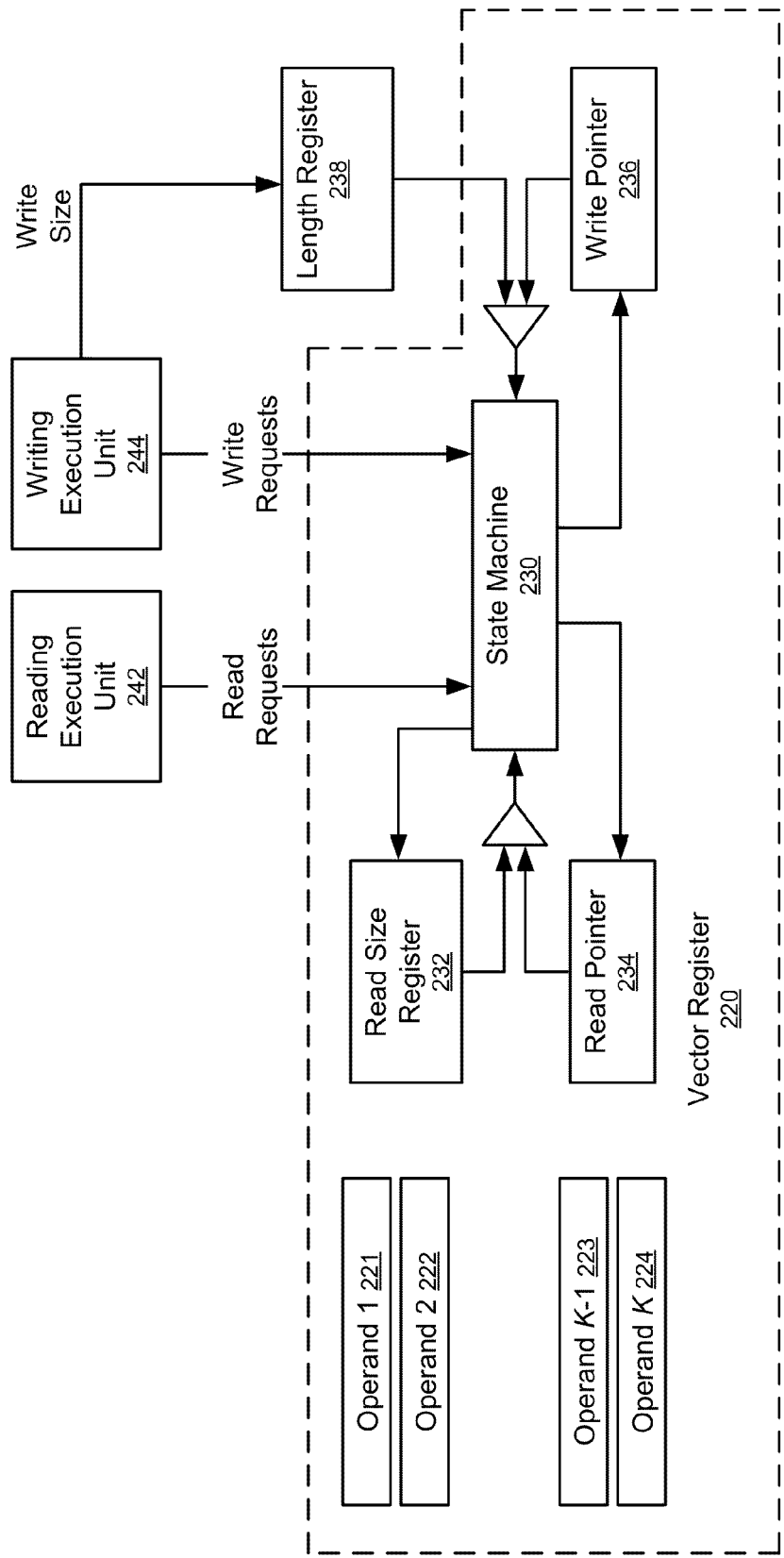
FIG. 2 shows a vector register in accordance with one or more embodiments of the invention.
Figure 3:
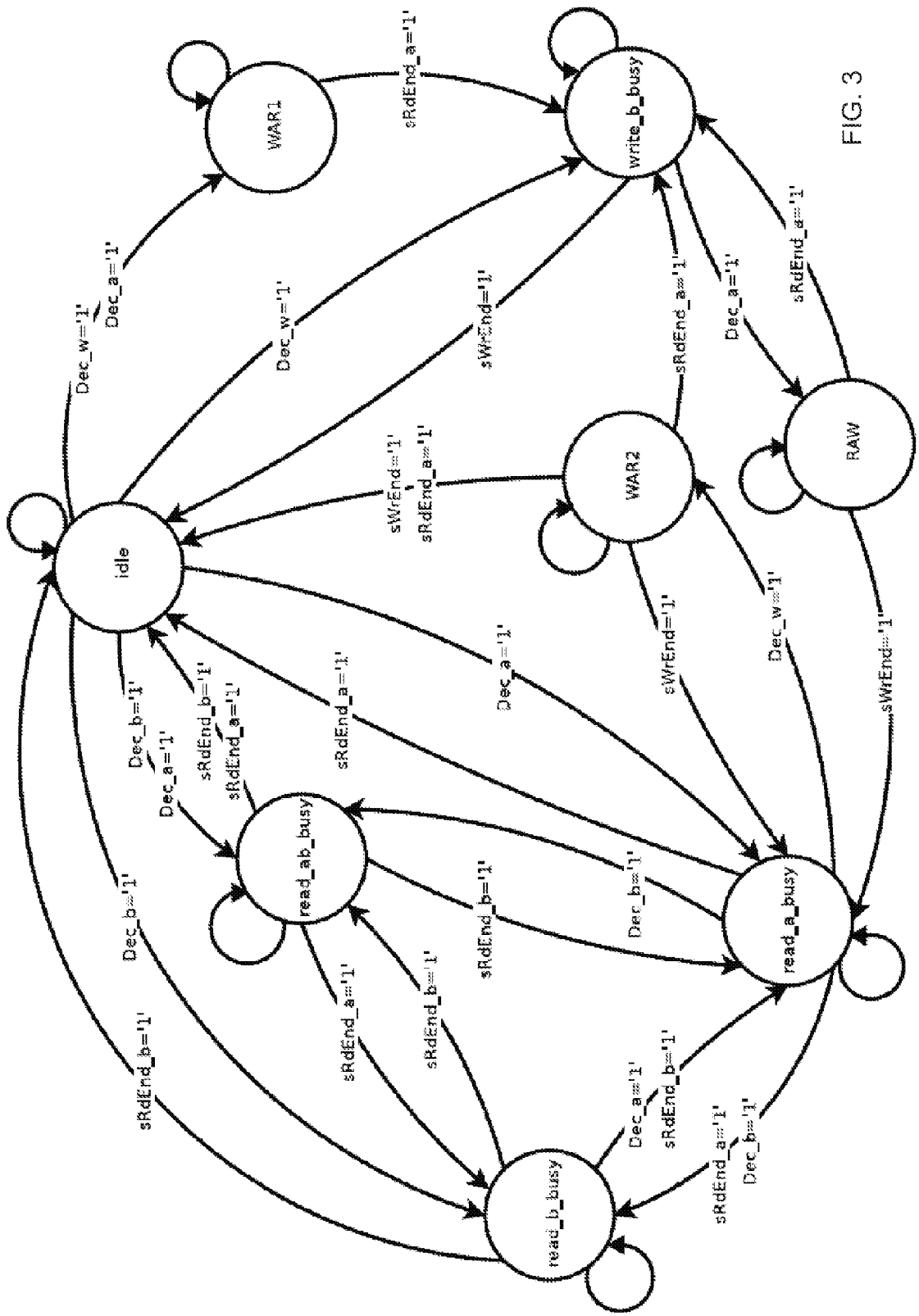
FIG. 3 shows a state machine of a vector register in accordance with one or more embodiments of the invention.

FIG. 2 shows a vector register (220) in accordance with one or more embodiments of the invention. The vector register (220) may correspond to the vector registers (105A, 105B, 105C) discussed above in reference to FIG. 1. As shown in FIG. 2, the vector register (220) stores an array of DFP operands (e.g., Operand 1 (221), Operand 2 (222), Operand K-1 (223), Operand K (224)). As also shown in FIG. 2, the vector register (220) also includes a state machine (230), a read size register (232), and multiple pointers (i.e., one for each port) (i.e., read pointer (234), write pointer (236). The vector register (220) is associated with a length register (238). In general, the length register (238) stores the number of operands in the vector register (220). This value may be referred to as the write size and, in general, is set by the last DFP execution unit writing DFP operands to the vector register (220). The vector register may also have comparators for comparing the pointers (234, 236) with the read size register (232) and the length register (i.e., write size), and reporting the results of the comparison (e.g., whether the compared values are equal) to the state machine (230). The operation of the vector register is controlled by the state machine shown in FIG. 3.

In one or more embodiments of the invention, when port B is used as a write port, port B's pointer is a write pointer. However, when port B is used as a read port, port B's pointer is a read pointer. Port A's pointer is always a read pointer.

In one or more embodiments of the invention, the writing execution unit (244) issues write requests to the vector register (220). In one or more embodiments of the invention, the reading execution unit (242) issues read requests to the vector register (220). In one or more embodiments of the invention, the reading execution unit (542) and the writing execution unit (544) are the same execution unit.

The functionality of the state machine (230) is to control the following: (i) increment, decrement and reset the address pointer for the two ports; (ii) set the data valid for the two ports to handle RAW; (iii) set the write wait flag to control WAR; (iv) set the busy flags to handle resource access given by decode; and (v) set the read size to control read operation in case of WAR.

FIGS. 4A-4F show a table of signals controlling a vector register state machine (230) and/or controlled by the vector register state machine (230).

I suggest remove this figure, as the description for some signals does not cover all the provided functionalities/inventions. I see also they are much detailed.

If you see a great importance for it to be present then let me update the tables in those figures to cover all inventions.

Modes of Operation of the Vector Register

2. Read from port B ->read_b_busy state.

3. Read from the two ports simultaneously ->read_ab_busy state.

4. Write on port B ->write_b_busy state.

5. Write on port B by an execution unit followed by read from port A from another execution unit ->read after write (RAW) state. In this state the reading core waits for at least one element to be written on port B. Within the RAW state the write pointer leads the read pointer.

6. Write on port B and read from port A by the same executer. In this case the memory is a source and destination for the same execution unit. An element is read from port A, processed by the execution unit and the result is written on port B after the core latency. Read and write operations are executed simultaneously. This is the write after read state #1->WAR1. In this state the read pointer leads the write pointer. Shift up/down operations are also executed within this state.

7. Write on port B and read from port A by different execution units. In this state an executer is given read access from port A and after an arbitrary time another executer is given the write access to port B. The read pointer must lead the write pointer to avoid overwriting at least one operand that has not been read yet by the reading executer. This is the write after read state #2->WAR2.

In RAM mode a single element is read from a specific memory location from either of the read ports, or written to a specific memory location to the write port. The vector indexing operations are supported in the RAM mode.

Timing Information

Read and write requests are synchronous to the clock edge. Read and write pointers are synchronous to the clock edge.

There is one clock cycle latency between a read request and the requested data being valid at the memory output.

The read and write requests from execution units should follow the read and write finish flags (wr_finish, Finish_a and Finish_b) combinationally. The read requests from execution units should follow the data valid flags (Data_valid_a and Data_valid_b) combinationlly. The write requests from executers should follow the write wait flag (WrWait) combinationally.

In one or more embodiments of the invention, for optimization purposes, the operand buses—delivering data and control signals from memory to execution units—may be pipelined. In such embodiments, special control will be added to account for the added latency for data valid and finish flags.

The idle state

In the idle state, the data valid flags hold their previous. Initially before the first write operation occurs, the data valid flags are zero. Within any of the write busy states, when the write operation is ended the data valid flags are set high. In the idle state the data valid flags hold their high state and the memory is ready for any read access. It's not allowed to give the read access to any execution unit before the first write operation has started. Specifically, it's not allowed to give read access on the vector register (any register in general) to any execution unit while the vector register is empty. In other words, read access can not be given to a vector register that has never been used before for a write operation.

Read after Write (RAW) State

In the RAW state, the Data_valid_a is set using the sData_valid_a_U which is set based on the following conditions:

(i) when the vShiftMode is "11" indicating that a shift down operation is still running, the data valid flag is set low until the write operation is ended;

(ii) when the vShiftMode is not "11" this includes two operations could be performed on port A:

(1) An index operation with an external pointer value, in this case the external pointer value is compared to the write pointer. The data valid is asserted when the write pointer is leading the external pointer value.

(2) A normal streaming operation from port A, in this case the write pointer is compared to the read pointer. The data valid is asserted when the write pointer leads the read pointer.

Figure 5:
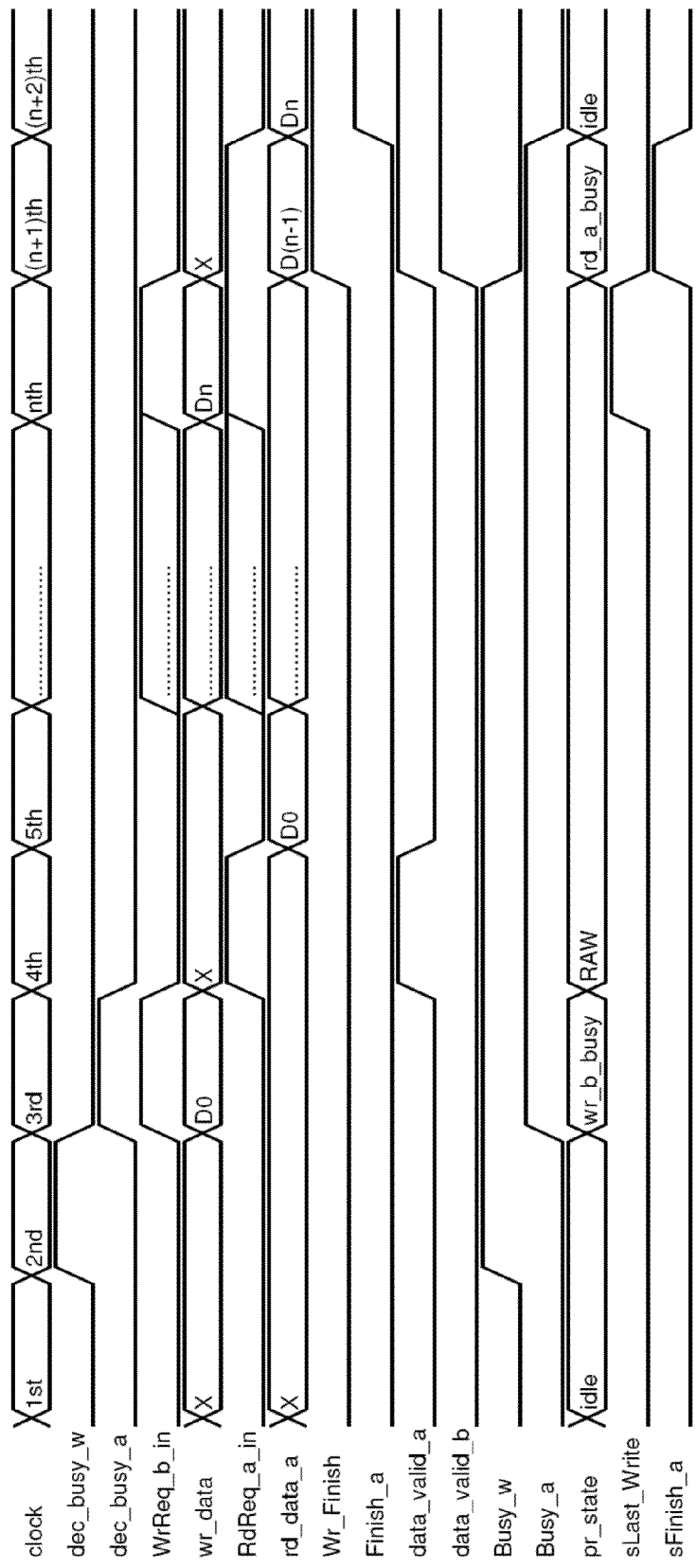
FIG. 5 shows a timing diagram with the behavior of the state machine, data valid and finish flags during a RAW state in accordance with one or more embodiments of the invention.

FIG. 5 shows a timing diagram with the behavior of the state machine, data valid and finish flags during a RAW state.

After the write operation is ended: (i) the state machine goes to the read busy state; (ii) the busy write flag goes low; (iii) the data valid flags go high and hold at the high state (they will be set low when a new write access is granted); (iv) the write finish flag go high and hold at the high state. It will be set low when a new write access is granted.

When the read operation is ended: (i) The read busy flag (Busy_a) goes low (it will be set high the next time the read access is granted); and (ii) the read finish flag (Finish_a) goes high (it will be set low the next time the read access is granted).

Whenever an operation has ended on any of the ports, the pointer corresponding to this port is reset to zero.

Write after Read (WAR) States

There are two states in the state machine that handle WAR conditions. A write after read state is obtained when:

(1) The memory is in the idle state and simultaneous read and write access are granted. This is indicated by Dec_Busy_W and Dec_Busy_A being high at the same clock. This condition happens when the vector is a source and destination for the same executer. The state machine goes to the WAR1.

(2) The memory is in the read_a_busy state and a write access is granted (Dec_Busy_W is high). The state machine goes to the WAR2 state.

In the WAR1 state two possible operations could be executed: (i) Normal streaming operation like V1=V1+V0; (ii) Shift up or down operation (discussed below). The shift direction is defined based on the Ld_Address_B and Ld_Address_A inputs.

Figure 6:
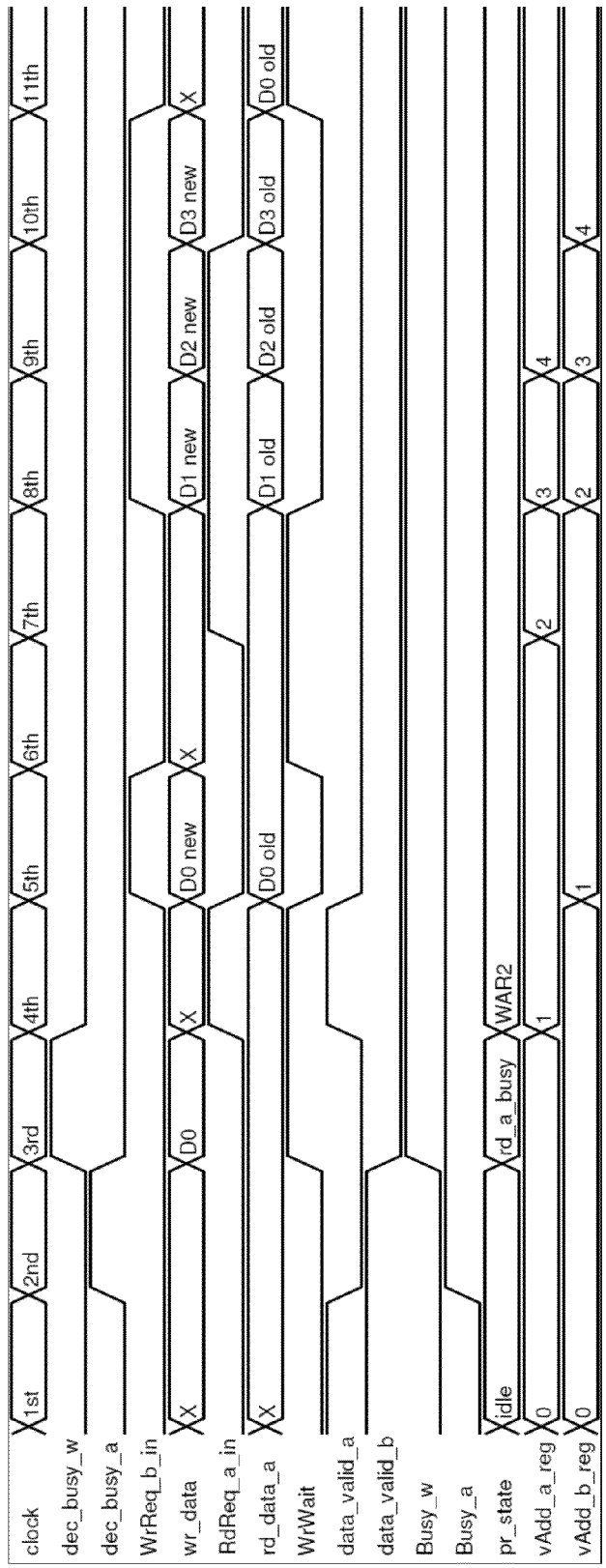
FIG. 6 shows a timing diagram with write wait control in accordance with one or more embodiments of the invention.

In the WAR2 state, the execution unit that is given read access on port A does not necessarily have the same throughput as the executer given write access on port B. The write wait control prevents the writing executer from overwriting the data stored in the vector before it has been read by the reading core. This condition occurs when the throughput of the reading core is lower that of the writing executer. As an example if a divider is given read access to port A and then after an arbitrary time an adder is given the write access to port B. The divider read an element each 6 clock cycles while the adder needs to write an element each clock cycle. The WrWait is set by comparing the read and write pointer, it guarantees that the read and write pointers are not aligned as long as the element corresponding to the current read pointer is not read yet. The timing diagram in FIG. 6 illustrates the behavior of the WrWait and it's effect on the write request sent from the writing execution unit.

Within the WAR2 state the data valid flag for port A is always high. Within the WAR1 state, the read and write ports are controlled by the same execution unit so, there is no possibility of difference between read and write speeds. Accordingly, the write wait is always zero in the WAR1 state.

Read Size and Write Size

In all states of operations the read and write sizes are identical except for the WAR2 state where the read size could be different from the write size. The read finish flag is set based on the operation running on the memory as follows: (i) in case of shift down (or stream down to up) the read finish flag is asserted when the read pointer(vAdd_a_reg) reaches zero; (ii) for the rest of the operations the read finish flag is asserted when the read pointer(vAdd_a_reg) reaches the read size(vRdSize_reg).

The write finish flag is set similarly as the read finish flag as follows: (i) in case of shift down (or write down to up) the write finish flag is asserted when the write pointer(vAdd_b_reg) reaches zero; (ii) for the rest of the operations the write finish flag is asserted when the write pointer(vAdd_b_reg) reaches the write size(wr_size).

Figure 7:
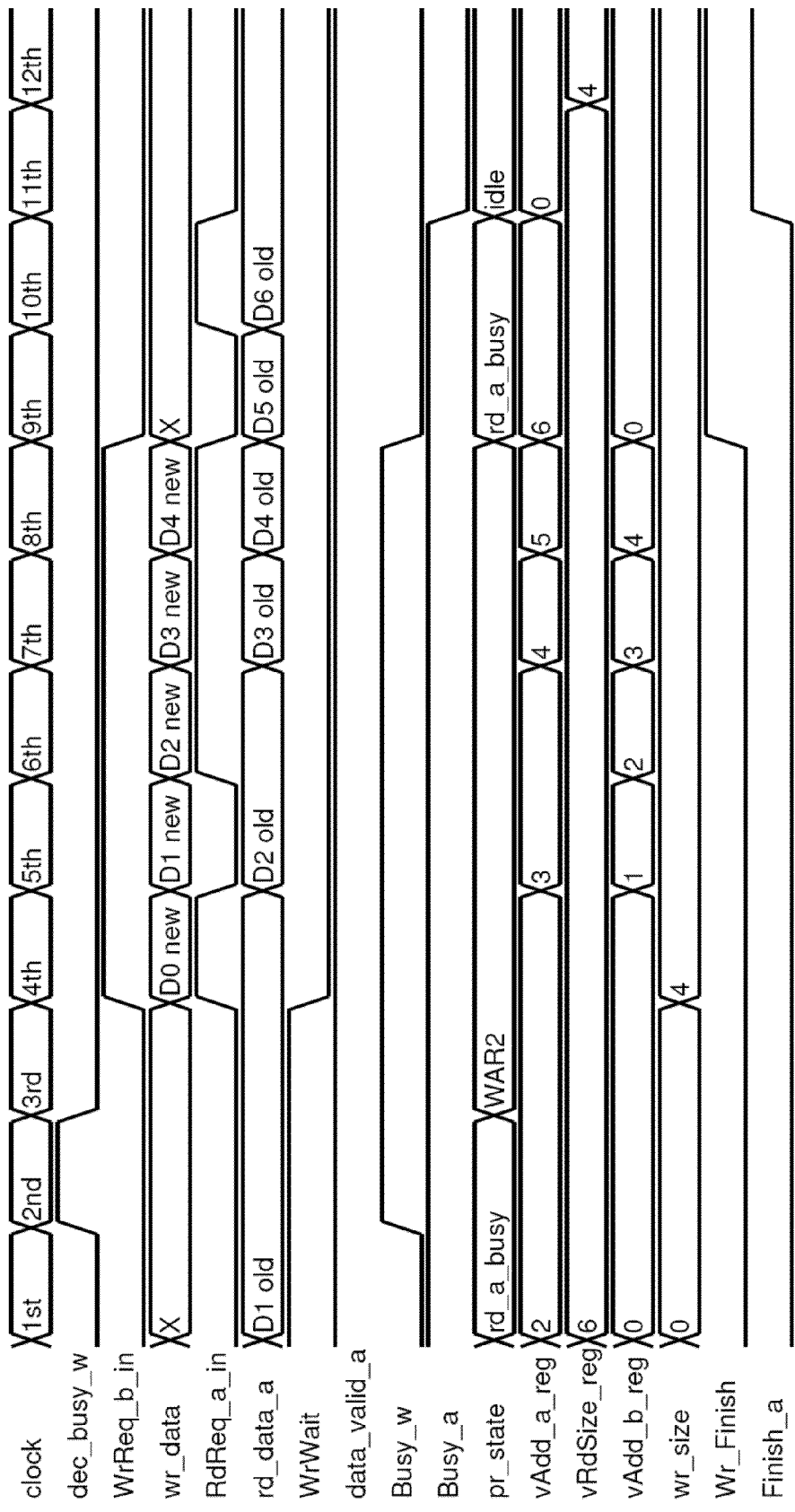
FIG. 7 shows a timing diagram of a WAR2 state where the read and write size are not equal and the write operation starts and ends while the read operation is still present in accordance with one or more embodiments of the invention.

The read size is assigned the write size in the write_b_busy or the RAW states. Once the write operation is finished the read size hold its value. In the WAR2 state, the read size could be equal to or different from the write size. The read and write operations should be independent in the time they will be finished. The read port still needs to work on the old size and the write port needs to work on the new write size set by the writing executer. FIG. 7 shows a timing diagram of a WAR2 state, where the read and write size are not equal and the write operation starts and ends while the read operation is still present.

It's assumed in FIG. 7 that a read operation is running, the read size is 6 and the read pointer is at position #2. The reading core is a slow core. A fast core (execution unit) is given write access on port B and the write size is 4. The read size remains unchanged while the write size changes. The write finish flag is asserted based on the write size and the write operation has ended. The read operation continues until the read pointer is aligned with the read size and hence the read operation is ended. After the read operation is ended and the state goes to idle, the read size is assigned the write size.

Figure 8:
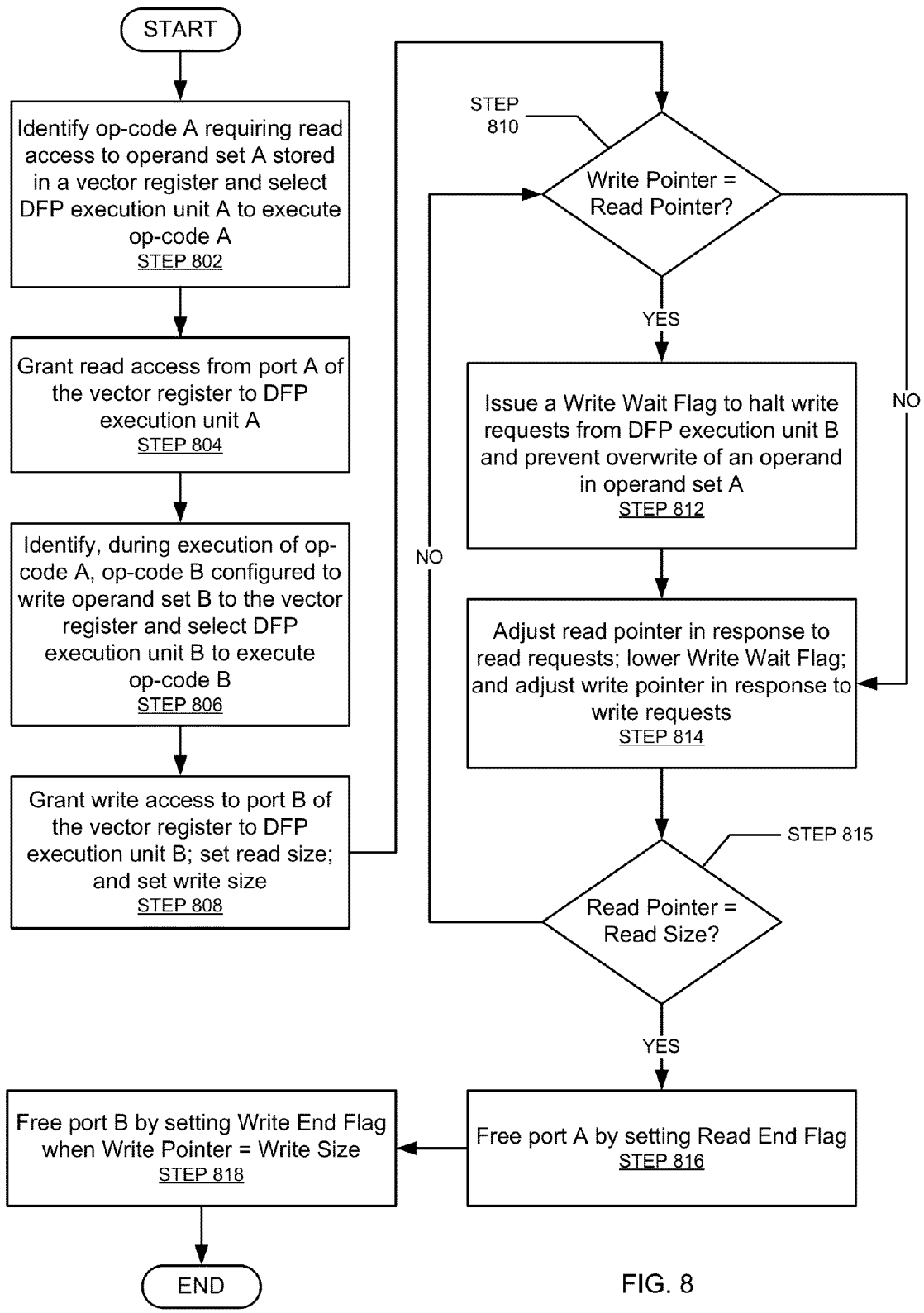
FIG. 8 shows a flowchart in accordance with one or more embodiments of the invention.

FIG. 8 shows a flowchart in accordance with one or more embodiments of the invention. The process in FIG. 8 corresponds to a method of operating a DFP processor in the WAR2 state, where the read and write size are not equal. The process describe in FIG. 8 may be executed using one or more components discussed above in reference to FIG. 1 and FIG. 2 (e.g., vector register (220), execution units (110A, 110B, 110C), length register (238), etc.). One or more steps shown in FIG. 8 may be omitted, repeated, and/or performed in a different order among different embodiments of the invention. Accordingly, embodiments of the invention should not be considered limited to the specific number and arrangement of steps shown in FIG. 8.

Initially, op-code A requiring read access to operand set A stored in a vector register is identified. Op-code A may be identified by the decoder. Moreover, the decoder may select DFP execution unit A to execute op-code A (STEP 802).

In STEP 804, read access from port A of the vector register is granted to DFP execution unit A. The read pointer (i.e., pointer of port A) is initialized according to op-code A.

In STEP 806, op-code A is being executed. Specifically, DFP execution unit A is issuing read requests to the vector register, and DFP operands are being read out of port A of the vector register in response to the read requests. In response to each read request, the read pointer is being incremented (or decremented). Moreover, during execution of op-code A, op-code B is identified (e.g., by the decoder). Op-code B is configured to write DFP operand set B to the vector register. DFP operand set A and DFP operand set B are different sizes. The decoder may select DFP execution unit B to execute op-code B.

In STEP 808, write access to port B of the vector register is granted to DFP execution unit B. The state machine in the vector register may relocate the value in the length register associated with the vector register to the read size register of the vector register. DFP execution B may store the size of operand set B in the length register. Moreover, the write pointer (i.e., pointer of port B) may be initialized based on op-code B. set to the first operand entry in the vector register; may be set to the final operand entry in the register; or may be set to an intermediate operand entry in the vector register, as specified by op-code B. STEP 808 is executing while execution of op-code A continues.

During execution of op-code B by the DFP execution unit B, DFP execution unit B is issuing write requests, and the DFP operands being written to port B are being stored in the vector register. The write pointer is being incremented in response to each write request.

In STEP 810, it is determined whether the write pointer equals the read pointer. This determination is made by the state machine of the vector register. As discussed above, op-code A and op-code B may concurrently execute at different rates. Accordingly, the read pointer and the write pointer are changing (i.e., incrementing) at different rates. When it is determined that the write pointer equals the read pointer, the process proceeds to STEP 812. When it is determined that the write pointer does not equal the read pointer, the process proceeds to STEP 814.

In STEP 812, a write wait flag is issued by the state machine The write wait flag forces DFP execution unit B to halt the issuance of write requests to the vector register and thus prevent DFP operands in operand set B from overwriting a DFP operand in operand set A that has not yet been read.

In STEP 814, as additional read requests are received from DFP execution unit A, the read pointer changes, and the write wait flag is lowered since the read pointer and the write pointer are no longer equal. In response to the write wait flag being lowered, DFP execution B may resume issuing write requests. The write pointer changes (i.e., increments) in response to the additional write requests.

In STEP 815, it is determined whether the read pointer equals the read size stored in the read size register of the vector register. When it is determined that the read pointer equals the read size, then the process proceeds to STEP 816. When it is determined that the read pointer does not equal the read size, then the pointer returns to STEP 810.

In STEP 816, when all of operand set A has been read out by DFP execution unit A, and thus the read pointer equals the read size, port A is freed by setting the read end flag.

In STEP 818, when all of operand set B has been written to the vector register by DFP execution unit B, and thus the write pointer equals the write size stored in the length vector, port B is freed by setting the write end flag.

Those skilled in the art, having the benefit of this detailed description, will appreciate that STEP 818 does not necessary occur after STEP 816. The location of STEP 816 depends on the rates of execution of op-code A and op-code B, and on the read size register compared to length register. This is shown in FIG. 7. In FIG. 7, the write operation starts and ends while the read operation is still running. In one or more embodiments of the invention, the write operation ends after the read operation ends. In one or more embodiments of the invention, the ends of the two operations coincide at the same instant.

Index & Shift Mode

Indexing a vector means reading or writing a specific location in the vector. Indexing the vector is the operation supported in the RAM mode. The vector is accessed by an external pointer (vPtrFromIndex) value from the shift&index executer. The shift operation is supported in the FIFO mode. The pointer value is initialized by a non zero value of vPtrFromIndex coming from the shift&index execution unit. The shift, index and copy under condition actions are specified by the value of the three controllers Ld_Address_A, Ld_Address_B and sShift_reg, as set forth in the table of FIG. 9. The values of the three inputs in the table of FIG. 9 are not necessarily set at the same clock. The actions shown in the table of FIG. 9 are based on the final state of the three inputs after setting the three of them.

Data Valid and Write Wait During Index Operations

During the RAW state and an index operation from port A is running, Data valid a depends on the comparison between the write pointer (vAdd_b_reg) and the external pointer value (vPtrFromIndex). The correct value of the data valid flag is sent to the execution unit after vPtrFromIndex being valid by a clock cycle during the RAW state. If the vector register is not write busy, the data valid flag is always valid.

Figure 10:
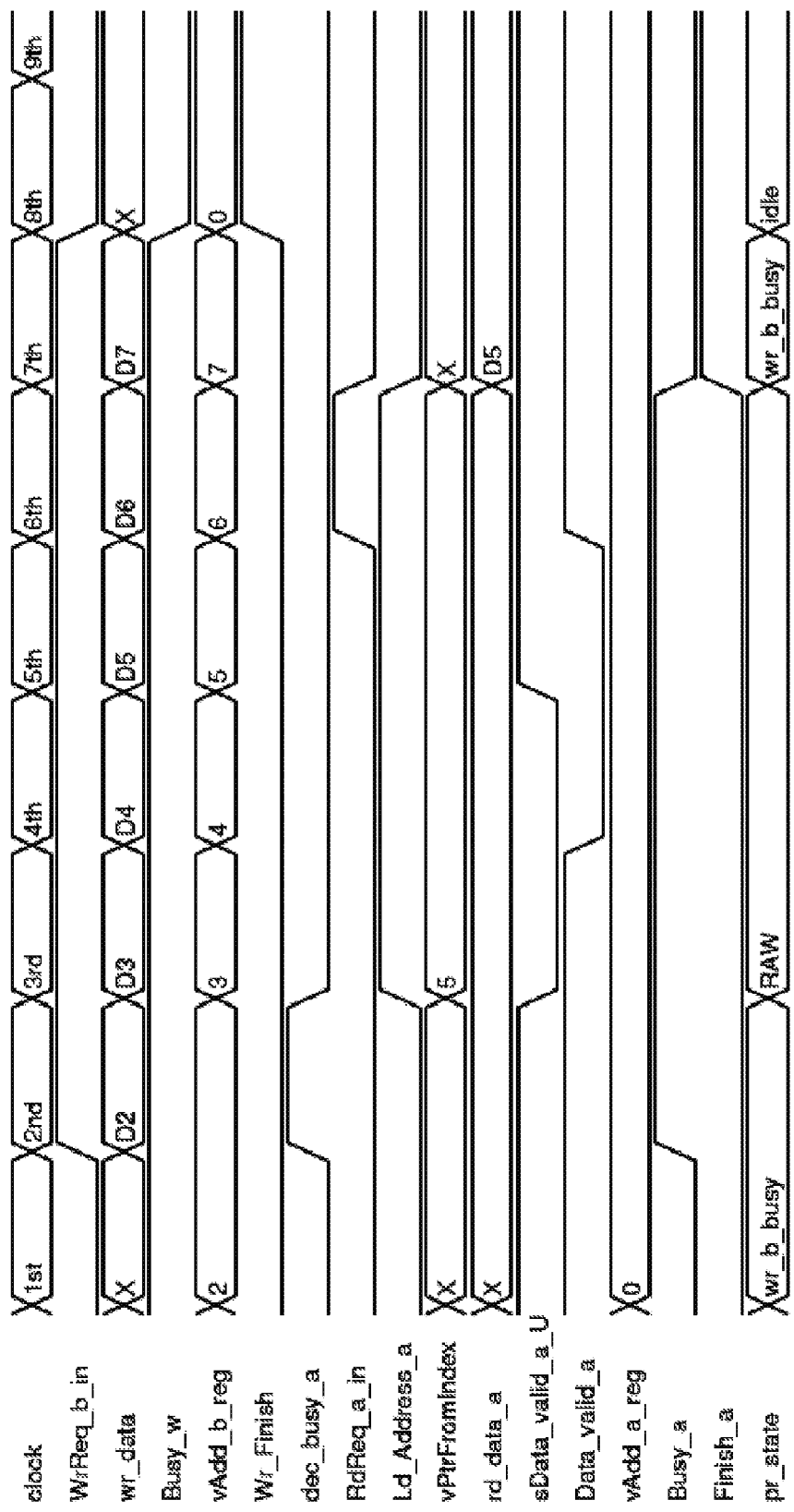
FIG. 10 shows a timing diagram corresponding to indexing from port A during a RAW state in accordance with one or more embodiments of the invention.

The wr finish flag read by the index&shift execution unit when low means that the index operation will be executed in the RAW state. When wr_finish is high this means that the memory is not write busy and the data is always valid. The shift&index execution unit should wait at least one clock cycle after sending the vPtrFromIndex to the vector register if the wr_finish of the vector is low. If wr_finish is high, the index&shift execution unit does not have to check the data valid flag to start reading the desired element. FIG. 10 shows a timing diagram corresponding to indexing from port A during a RAW state.

Figure 11:
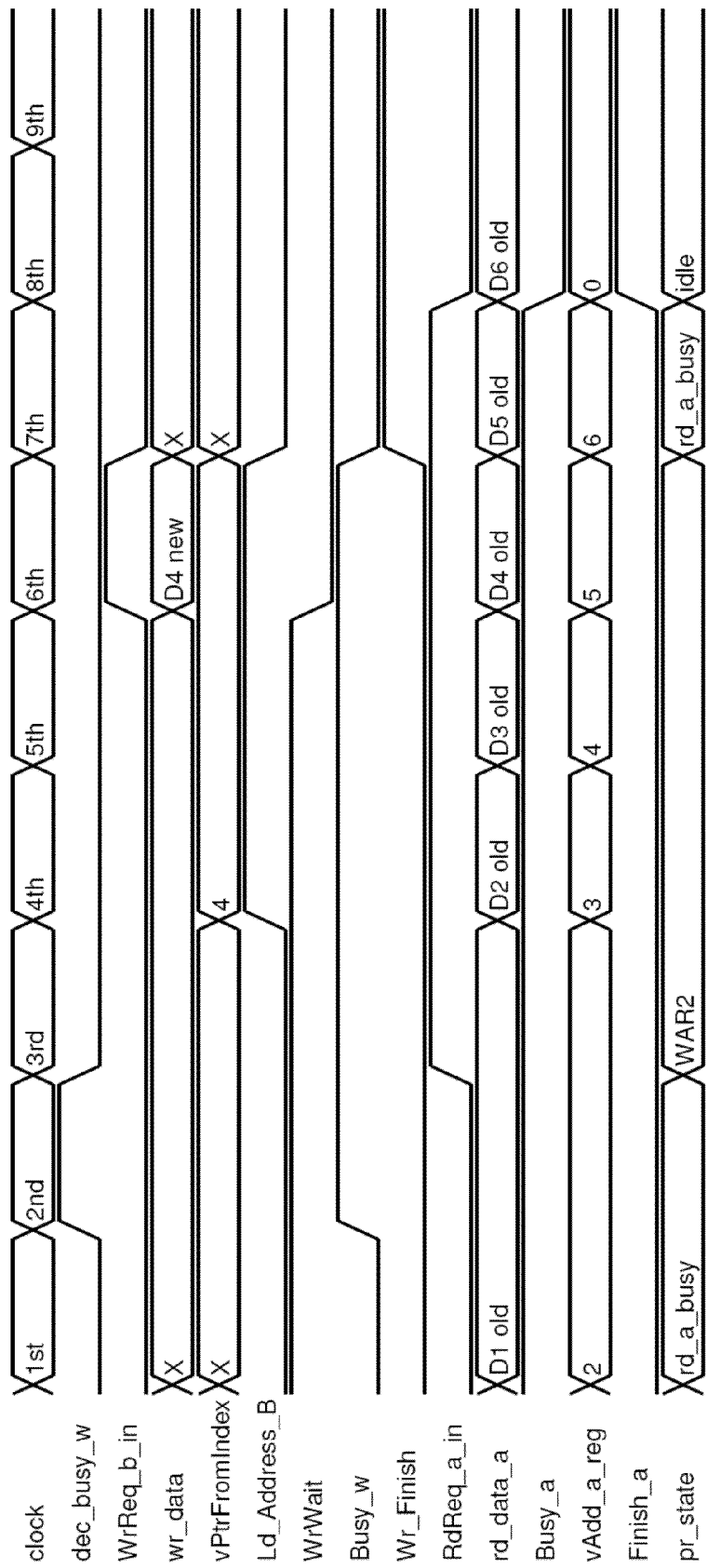
FIG. 11 shows a timing diagram corresponding to indexing to port B during a WAR2 state in accordance with one or more embodiments of the invention.

During the WAR2 state and an index operation to port B is running, WrWait is set based on the comparison between the next read pointer (vAdd_a_nx) and the external pointer value (vPtrFromIndex). The index&shift execution unit should wait at least one clock cycle after setting the write pointer to obtain the correct WrWait flag value. FIG. 11 shows a timing diagram corresponding to indexing to port B during a WAR2 state in accordance with one or more embodiments of the invention.

Pointer Initialization During Shift Operations

Shifting up is the operation V(i)=V(i+x), where x is the shift amount, V is the vector register, and V(j) is the DFP operand at location j in the vector register. Shifting down is the operation V(i+x)=V(i), where x is the shift amount, V is the vector register, and V(j) is the DFP operand at location j in the vector register. A shift operation requires the initial values for the read and write pointers to be displaced from each other by a certain value which is equal to the shift amount. FIG. 12 shows a table with the initial values of read and write pointers for each of the shifting directions assuming a shift amount of Sa in accordance with one or more embodiments of the invention.

Incrementing or decrementing the pointers is done via two adders. For all states of operation of the memory the adders act as incrementers. For the case of shift down or streaming from down up, the adders act as decrementers. For any of the adders, OpA is the positive operand, OpB is either positive for increment or in ones complement for decrement. The carry in to the adders is forced zero in case of increment and one in case of decrement.

When the shift amount is valid at the memory side, the memory takes a clock cycle to initialize the read and write pointers. After this clock cycle the pointers are incremented or decremented according to shift direction. The two signals sPtrCaptured_A and sPtrCaptured_B are set high when read pointer and write pointer are initialized respectively. The read and write pointers are vAdd_a_reg and vAdd_b_reg. During the clock cycle when the pointers are initialized, the adders are idle. The idle time of the adder for port A is used to calculate the initial value of the read pointer (wr_size—Sa) is shown in the table of FIG. 12. The values of OpA, OpB and sCin for the two adders as a function of the shift direction and the two signals sPtrCaptured_A and sPtrCaptured_B are illustrated in tables in FIG. 13 and FIG. 14. In the table of FIG. 13, OpA_A, OpB_A and sCin_A represent the two operands and carry in for port A adder. In the table of FIG. 14, OpA_B, OpB_B and sCin represent the two operands and carry in for port B adder. The signal sIncrRdPtr follows the read request to port A. The signal sIncrWrPtr follows the write request or read request for port B in case of write or read respectively.

Figure 15:
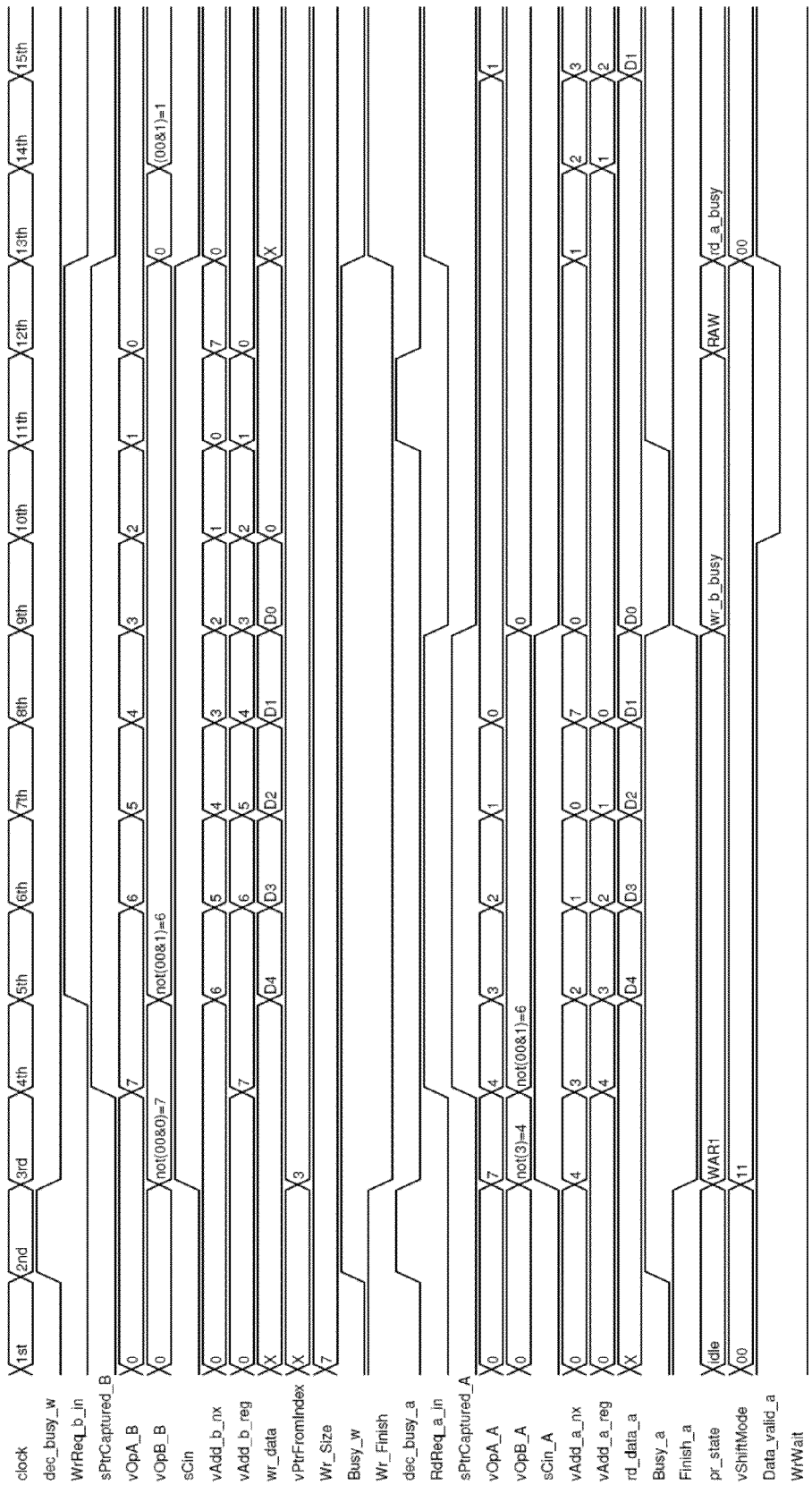
FIG. 15 shows a timing diagram corresponding to a shift down operation in accordance with one or more embodiments of the invention.

The operation of pointers initialization and pointers decrement within a shift down operation is illustrated in the timing diagram of FIG. 15.

In the 1st clock cycle, the memory is in the idle state. Data_valid_a flag is high because of the last written data. This data is meant to be shifted down later. The wr_size is 7, Busy_a and Busy_w are down.

In the 2nd clock cycle, dec_busy_w and dec_busy_a are set high by the decode to give the index&shift execution unit read and write access on port A and port B respectively. According Busy_a and Busy_w go high.

In the 3rd clock cycle the read and write finish flags are down. The index executer sent a shift amount of three (vPtrFromIndex=3). Operands A&B and Carry in for the two adders are set according to tables(20, 21). Read and write pointer initial values are set.

In the 4th clock cycle, read and write pointers are initialized. The signals sPtrCaptured_B and sPtrCaptured_A go high. Read pointer vAdd_a_reg=4, write pointer vAdd_b_reg=7 according to tables in FIG. 13 and FIG. 14. The index&shift execution unit started to read data. Read and write pointers are decremented via the adders.

In the 5th clock cycle, first read data D4 is output and write request is asserted by the index&shift execution unit to write the read data.

In the 6th; 7th; 8th cycles, the rest of data are read and the last data is being read. The read data are also written by the executer. Both pointers are being decremented.

In the 9th clock cycle, last data is read, read operation is finished, Busy_a goes down. Read pointer is reseted to zero, the finish flag unlike other conditions is asserted when pointer reaches zero not the read size. The signal sPtrCaptured_A is reseted to zero. The carry in bit to port A adder goes back to zero, the operands return to their values in normal conditions as shown in the table of FIG. 13. State machine goes to the write b busy state. The last data D0 (DFP operand) is available to be written.

In the 10th; 11th; 12th clock cycle, the read operation has ended, the executer will write DPD zero value in the remaining four places in the vector. The Data_valid_a is set to zero until the first element of the vector is written.

At the 11th clock cycle, the read access is granted on port A for another executer, at the same time the index&shift execution unit is still writing the rest of the DFP operands on port B. The executer given access to port A is waiting for Data_valid_a to go high to start reading.

In the 12th clock cycle, the last element is to be written.

In the 13th cycle, the Data_valid_a goes high and the other executer sends the read request. The index&shift execution unit finished writing, the Busy_w flag goes down and the wr_finish flag goes high. The write pointer is reseted to zero, the operands of port B adder and carry in return to their values when the adder works as incrementer.

In the 14th cycle the reading core reads the first element which is zero as written by the shifter.

The shift up operation is similar to the shift down but more simple. The write pointer starts from zero not from the write size. The read pointer start from the shift amount (vPtrFromIndex) not from wr_size-vPtrFromIndex. The pointers are incremented not decremented. The finish flags are asserted when pointers reach the size not zero. The data valid flag is never set low when read is finished as the write pointer is incrementing and the read pointer is less than the write pointer. The read pointer only needs to be initialized while the write pointer starts from the normal initial value of zero.

Figure 16:
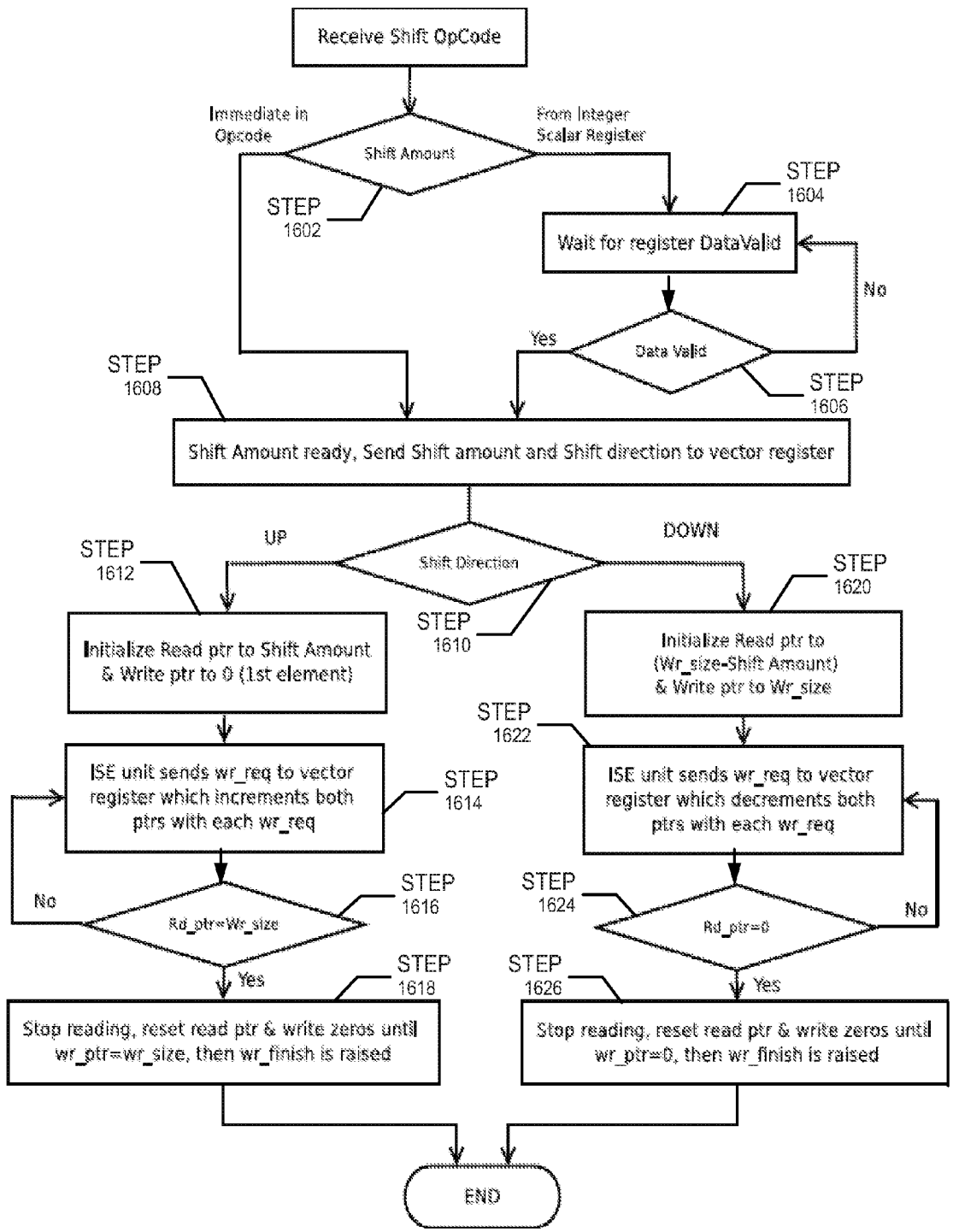
FIG. 16 shows a flowchart in accordance with one or more embodiments of the invention.

FIG. 16 shows a flowchart in accordance with one or more embodiments of the invention. The process in FIG. 16 corresponds to a method of operating a DFP processor with respect to a shift operation (e.g., shifting up, shifting down). The process describe in FIG. 16 may be executed using one or more components discussed above in reference to FIG. 1 and FIG. 2 (e.g., vector register (220), control operation execution units, length register (238), etc.). One or more steps shown in FIG. 16 may be omitted, repeated, and/or performed in a different order among different embodiments of the invention. Accordingly, embodiments of the invention should not be considered limited to the specific number and arrangement of steps shown in FIG. 16.

Initially, a shift op-code is identified by a decoder (STEP 1601). The decoder may select an index&shift execution (ISE) unit to execute the shift op-code. The shift amount associated with the shift instruction could be loaded as an immediate value in the op-code. Otherwise it will stored in an integer scalar. The address of the integer scalar holding the shift amount will be provided within the op-code of the shift instruction. There is a bit in the shift instruction op-code that informs the ISE either the shift amount is immediate or is stored in an integer scalar (STEP 1602).

If the shift amount is stored in an integer scalar, the ISE will wait (STEP 1604) for the data valid signal (STEP 1606) of the integer scalar to tell that the shift amount is present in the integer scalar.

In STEP 1608, the ISE sends the shift amount and the shift direction to the vector register. The ISE will not send the shift direction to the vector register until the shift amount is ready, whether it was immediate or stored inside an integer scalar. In case the shift amount is an immediate value, it's sent from ISE unit to the vector register immediately.

The decode stage informs the vector register of a shift operation at the instant the write access to port B of the vector register is granted for the ISE. The shift direction is sent from ISE to the vector register after minimum one cycle.

In STEP 1610, the shift direction (i.e., shift up, shift down) is determined.

In one or more embodiments of the invention, the shift direction is defined via a two bit signal passed to the vector register.

In STEP 1612, the read pointer of port A of the vector register is initialized to the shift amount, while the write pointer of port B is initialized to 0.

In STEP 1614, the ISE issues a read request to read the DFP operand referenced by the read pointer from the vector register, and then issues a write request to write the DFP operand to a location/entry referenced by the write pointer. In this step, the read and write operations do run simultaneously. Instead, the read operation starts before the write operation by one clock cycle. The write request triggers both the read pointer and the write pointer to adjust (i.e., increment).

In STEP 1616, it is determined whether read pointer equals the write size. When it is determined that the read pointer does not equal the write size (i.e., stored in the length register associated with the vector register), the process returns to STEP 1614 because the shift operation is not complete. However, when it is determined that the read pointer equals the write size, the process proceeds to STEP 1618.

In STEP 1618, the read pointer is reset to 0. Moreover, a series of zeros is written until the write pointer equals the write size (i.e., each zero that is written causes the write pointer to increment by one). The wr_finish flag is then raised.

In STEP 1620, the read pointer of port A is initialized to a difference between the write size (i.e., stored in the length register) and the shift amount (i.e., read pointer=write size−shift amount). The write pointer of port B is initialized to the write size.

In STEP 1622, the ISE issues a read request to read the DFP operand referenced by the read pointer from the vector register, and then issues a write request to write the DFP operand to a location/entry referenced by the write pointer. The write request triggers both the read pointer and the write pointer to adjust (i.e., decrement). In this step (and in STEP 1614), the read and write operations do run simultaneously. Instead, the read operation starts before the write operation by one clock cycle.

In STEP 1624, it is determined whether the read pointer is zero. When it is determined that the read pointer is not zero, the process returns to STEP 1622. When it is determined that the read pointer is zero, the process proceeds to STEP 1626.

In STEP 1626, the read pointer is reset, and zeros are written until the write pointer equals zero (i.e., each zero that is written causes the write pointer to decrease by one). The wr_finish flag is then raised As discussed above, the index&shift execution unit has 2 main functions: Index and shift. The shift function shifts the elements in a vector register either up or down by a certain shift amount and store it back in the same vector register. FIG. 17 shows a 6 element vector register, and how it can be shifted up by 3 or shifted down by 4.

Figure 18:
FIG. 18 shows a shift op-code in accordance with one or more embodiments of the invention.

The shift operation uses special vector registers as both source and destination. The number of these registers is generic(NUM SHIFT INDEX). The offset register (1st register used for shift and index) is also generic (SHIFT INDEX OFFSET). In one or more embodiments of the invention, the format of the shift instruction (i.e., shift op-code) is as shown in FIG. 18.

The "UnD" bit defines the shift direction either up or down. Before the start of shift operation, the shift amount must be ready. As discussed above, this value can be obtained either as an immediate value from Opcode or can be read from an integer scalar register according to the "ImnInt" bit in the instruction as in FIG. 18. Now, the ISE unit has the shift amount, it will use it to initialize/set the read and write pointers according to the shift direction. In case of Shift_Up, the read pointer is set to the shift amount, and the write pointer is left at its default (beginning of the vector) and both are incremented until reading the vector is finished. At this point, the read pointer has reached the last element, the write pointer will continue to write the full vector size but writing zeros.

In case of Shift Down the reverse operation is done, the read pointer is set to (vector size—shift amount) and the write pointer is set to the last element of the vector and both are decremented, till the read pointer reaches the first element of the vector. At this point, the write pointer will continue to decrement writing zeros up till the beginning of the vector (i.e., Reading is done from the element to be written at the bottom of the vector going up and Writing is done from the bottom of the vector going up).

For Shift Operation, either Up or Down, both ports A and B of the vector must be free, as reading is done on port A and writing on port B. If one of them is busy, a Stall will occur.

For shift up operations, the sequence will be as follows: the pointer which will be equal to the shift amount is obtained by the executer either from the opcode or scalar integer register. When the pointer is obtained, pointer ready signal is raised, pointer is sent to memory to set the read pointer to the shift amount and Memory mode is set to "10" (i.e., set read=1 , set write=0). In the next clock, the memory will have set the read pointer to the shift amount and the write pointer to "0", so sRdReq_Vectors is raised by the executer. In the next clock, data at the read pointer is latched in the executer in the signal (sIndex Shift Result) which goes to DPD Result. The write request is raised in the next clock cycle to write the DPD_Result at the 1st element. At the vector register, both read and write pointers are incremented every clock and the previous sequence is repeated. This will continue until read pointer reaches the end of the vector, in the next clock, sVec ScalarDataFinish rises to '1' and sRdReq Vectors will go to '0'. Memory mode will be reset to "00" also. The write request remains='1' (writing zeros) until write_finish is asserted which will happen when the whole size is written on the vector. The reset read is not needed in this case as we read till the end of the vector.

Figure 19:
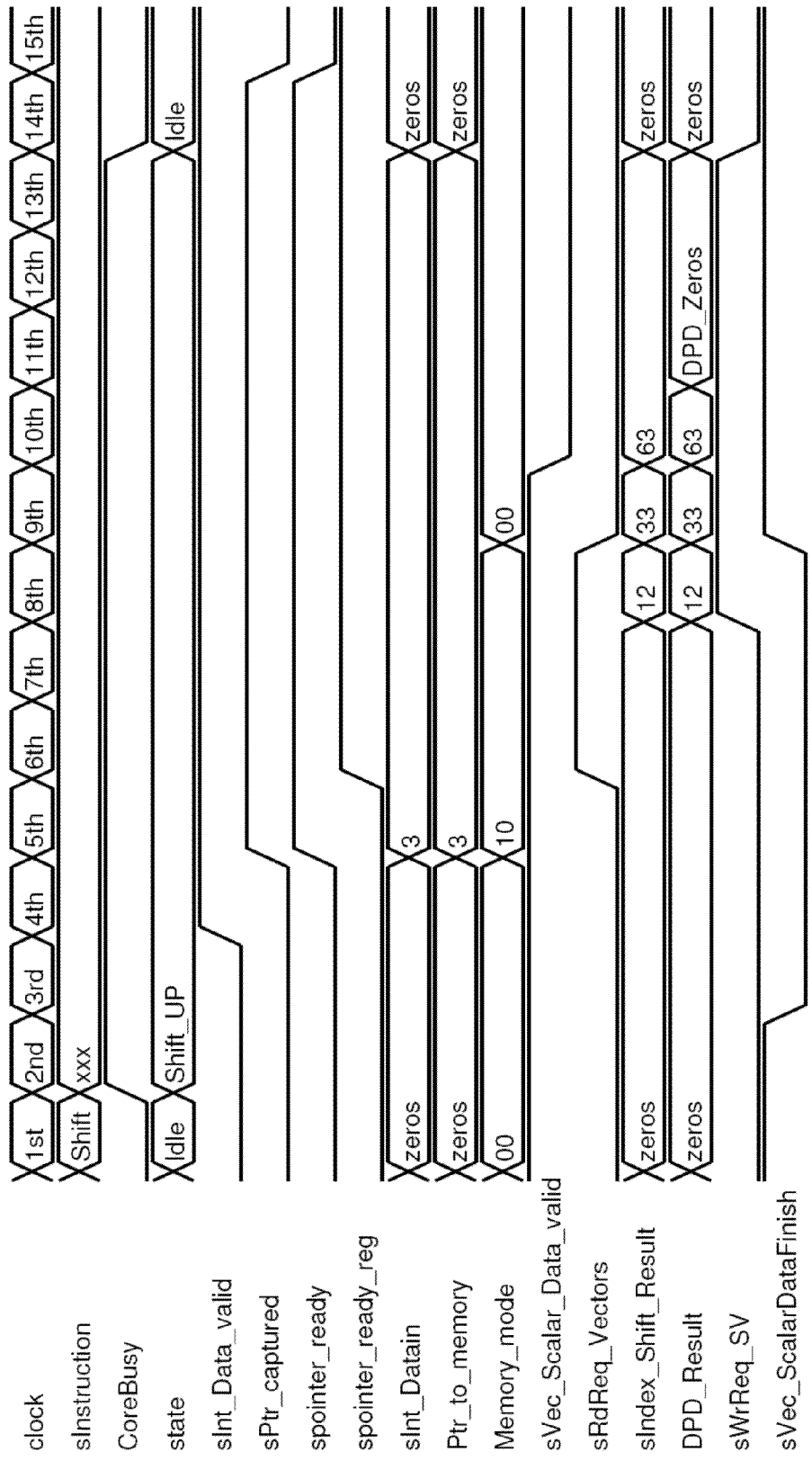
FIG. 19 shows a timing diagram corresponding to a shift up operation in accordance with one or more embodiments of the invention.

FIG. 19 shows a timing diagram corresponding to a shift up operation in accordance with one or more embodiments of the invention. In FIG. 19, the shift amount of 3 is obtained from an integer scalar register.

1st clock: instruction is Decoded
    2nd clock: Busy rises, will wait for the data valid of the integer scalar register to capture the pointer
    3rd clock: Still waiting for the data valid of the integer scalar register to capture the pointer. The data finish is de-asserted to grant read access to the executer.

4th clock: Integer data (containing shift amount) is valid

5th clock: Pointer is captured, spointer_ready is asserted, Pointer and mode are sent to memory. Memory mode is set to (10) to initialize the read pointer in the memory with the shift amount value (3).

6th clock: spointer_ready_reg is asserted which means the memory has set the read pointer to the right value which is (3), and the data valid is asserted, so the executer can read. Therefore, the read request is asserted.

7th clock: The $1^{st}$ read data (12) is available from memory but it will be registered inside the executer before it's written back in the shifted position for timing optimization purposes.

8th clock: The registered value of the $1^{st}$ read data is ready to be written (sIndex_Shift_Result) which goes to DPD_Result. The Write Request is asserted to write DP_Result to address (0) in the destination register.

9th clock: DPD Result will contain element (4) of the original data, will be written to address (1). Read request will be de-asserted in this clock, as the last element has been read. Data Finish is asserted and memory_mode is reset to (00)

10th clock: DPD Result will contain element (5) of the original data, will be written to address (2).

11th, $12^{th}$, & 13th clock: zeros are written into addresses (3),(4),(5)

14th clock: WrReq and CoreBusy are de-asserted.

15th clock: spointer_ready and sPtr_captured are de asserted.

For shift down operations, the opposite sequence will happen: the pointer which will be equal to the shift amount is obtained by the executer either from the op-code or scalar integer register. When the pointer is obtained, pointer ready signal is raised, pointer is sent to memory to set the read pointer to (Vecsize—Shift Amount) and the write pointer is set to the last element of the vector. Memory mode is set to "11" (i.e., set_read=1, se_write=1). In the next clock, with the read and write pointers set to the write addresses, sRdReq_Vectors is raised by the executer. In the next clock, data at the read pointer is latched in the executer in the signal (sIndex_Shift_Result) which goes to DPD Result. The write request is raised in the next clock cycle to write the DPD Result at the last element. At the memory, both read and write pointers are decrement every clock and the previous sequence is repeated. This will continue until read pointer reaches the beginning of the vector. In the next clock, sVec_Scalar-DataFinish is asserted and sRdReq Vectors will be de-asserted. Memory mode will be reset to "00" also. The write request remains='1' (writing zeros) until write finish='1' which will happen when the whole size is written on the vector. The reset read is not needed in this case as we read and write the whole vector size.

Figure 20:
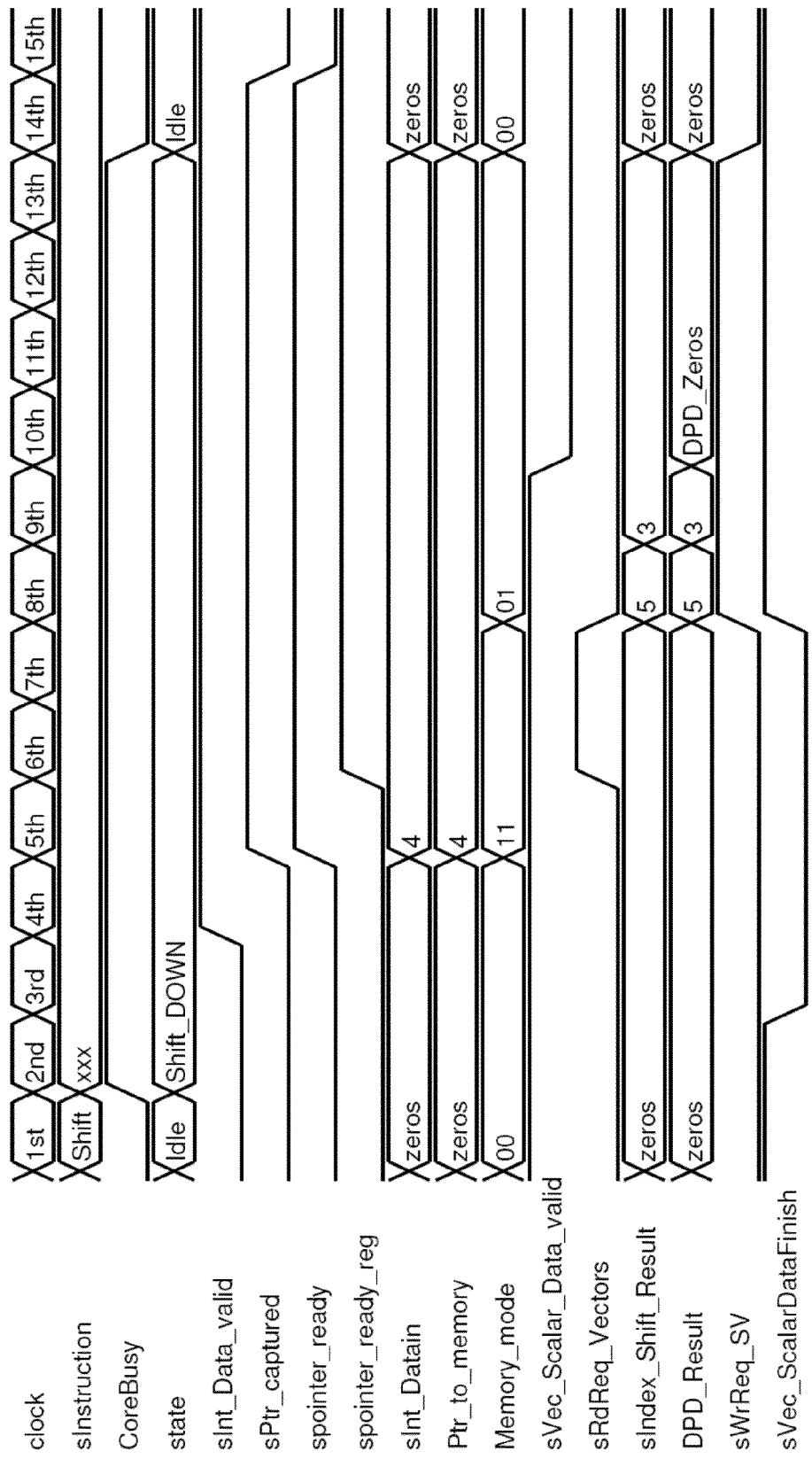
FIG. 20 shows a timing diagram corresponding to a shift down operation in accordance with one or more embodiments of the invention.

FIG. 20 shows a timing diagram corresponding to a shift down operation in accordance with one or more embodiments of the invention. In FIG. 20, the shift amount of 4 is obtained from an integer scalar register.

1st clock: instruction is Decoded

2nd clock: Busy rises, will wait for the data valid of the integer scalar register to capture the pointer.

3rd clock: Still waiting for the data valid of the integer scalar register to capture the pointer. The data finish is de-asserted to grant read access to the executer.

4th clock: Integer data (containing shift amount) is valid.

5th clock:—5th clock: Pointer is captured, spointer_ready is asserted,

Pointer and mode are sent to memory. Memory mode is set to (11) to initialize the read and write pointers in the memory.

The read pointer is initialized with (write size−shift amount=5−4=1) and the write pointer is initialized with the write size (5).

6th clock: spointer_ready_reg is asserted which means the memory has set the read and write pointers to the right values, and the data valid is asserted, so the executer can read. Therefore, the read request is asserted.

7th clock: The $1^{st}$ read data (5) is available from memory but it will be registered inside the executer before it's written back in the shifted position.

8th clock: The registered value of the $1^{st}$ read data (at address (1)) is ready to be written (sIndex_Shift_Result) which goes to DPD_Result. The Write Request is asserted to write DPD_Result to address (5) (last element) in the destination register. The read request is de-asserted as the read pointer has reached the beginning of the vector register.

9th clock: Write pointers is decremented. Data at the read pointer (0) is written to address (4) of the vector.

10th,11th,12th & 13th clock: zeros are written into addresses (3),(2),(1),(0)

14th clock: WrReq and CoreBusy are de-asserted

15th clock: spointer_ready and sPtr_captured are de asserted.

As discussed above, the index&shift execution unit has 2 main functions: Index and shift. With respect to index, the index&shift register allows the user to either select one element from a vector register and copies it to a scalar register or copy a value from scalar register into a certain location in a vector register.

Figure 21:
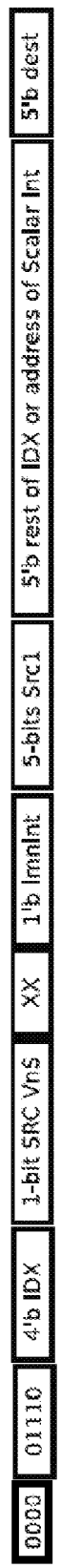
FIG. 21 shows an index op-code in accordance with one or more embodiments of the invention.

In a similar manner to the shift operation, it is necessary to get a value to regarding the required element to be copied from the vector to the scalar, or this value will be used as destination for the loaded scalar value that needs to be stored in the vector. In case we need to copy a value from vector register to scalar one, it is necessary to set the read pointer according to that value. Only one element will be read and then the one element will be written to the destination scalar. In case we need to copy a value from scalar register to vector, we need to set the write pointer according to that value. We will write just one element. In one or more embodiments of the invention, the index op-code is as shown in FIG. 21.

Index Vec to Scalar

The sequence will be as follows: the pointer is obtained by the executer from the opcode or scalar integer register. According to "sImnInt" signal, if '1', pointer is obtained from the opcode through the input "Pointer", otherwise, pointer is obtained from "sInt_Datain" which gets the output of the coreInMux "sInt_Operand" when data valid (sInt_Data_valid) of that MUX is '1'. To tell that pointer is ready, we have a signal called "spointer_ready" which is '1' when "sImnInt" is '1' otherwise, it is raised just when the executer could latch the pointer inside "sInt_Datain". The pointer is connected to all vectors that support Shift/Index through the output "Ptr to memory". Next, we need to set the mode for the memory. Memory has specific requirements for the memory mode.

Memory mode value depends first on the current operation of the executer and (in our case) on the port to be used. Signal "Set_Rd_Wr" holds the mode for the operation. The Set_Rd_Wr will have special assignment in this case depending on the read port (A or B). If the read port is A, Set_Rd_Wr will have the value "10" while if the read port is B, Set Rd Wr will have the value "01". This is a requirement by the memory. Memory mode is not updated until we have "spointer ready" signal to be '1', otherwise it remains as "00". If memory mode is set before pointer, the old pointer(not valid one) will be used (may be zero) and first element is indexed.

After pointer and memory mode are set, we wait for data valid signal from the CoreInMux used for reading the DPD vector. Then we send the read request "sRdReq_Vectors" and get the element through the signal "sVec_Scalar_DPD Operand" (out of the CoreInMux). Read request is raised for just one clock cycle because we only need to read just one element, then reset the vector using signal "sRstRd_VS" to release it. Next we write this element to the destination scalar and write request is raised for just one clock cycle.

In case of Index operation, busy signal of the core rises as other cores, and ends after write request signal is raised. We use the vector in reading state, so one port (either A or B) is used.

Figure 22:
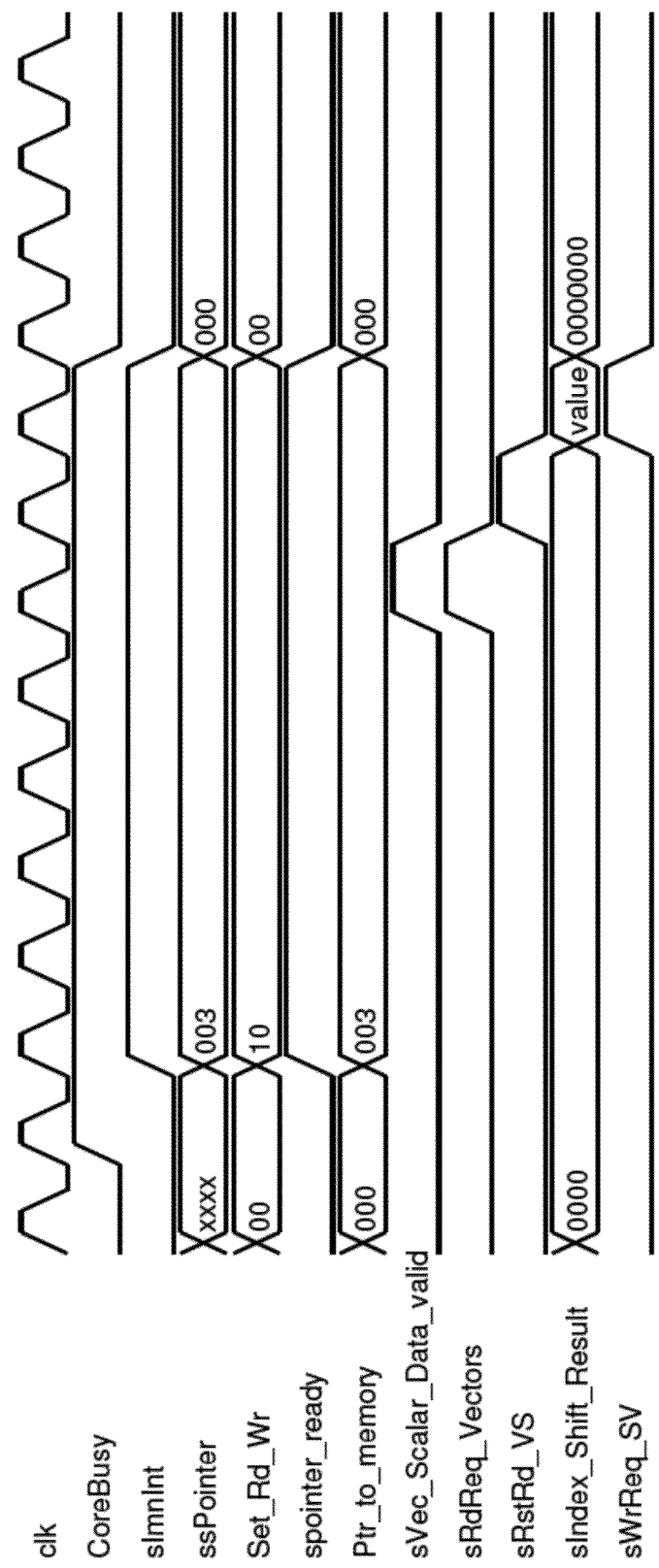
FIG. 22 shows a timing diagram for an index operation from vector to scalar in accordance with one or more embodiments of the invention.

FIG. 22 shows a timing diagram corresponding to an index operation from vector to scalar with the following parameters: a—Pointer comes from the opcode, so "sImnInt" signal is '1'. b—Pointer value is 3.

Index Scalar to Vector

Like vector to scalar, we need to get the pointer either from the opcode or from integer scalar. But the pointer will be used as an address for the element inside the destination vector to be changed. RdReq is not needed as we read from Scalar so it is set to '0'. The executer will get the scalar value as soon as it's valid from the CoreInMux. Memory mode is set like in vector to scalar after spointer ready='1' but with value "01". "Ptr_to_memory" must be available before mode is set like in the previous case. After the pointer is ready and the value is latched, write request will be raised for one clock cycle.

Figure 23:
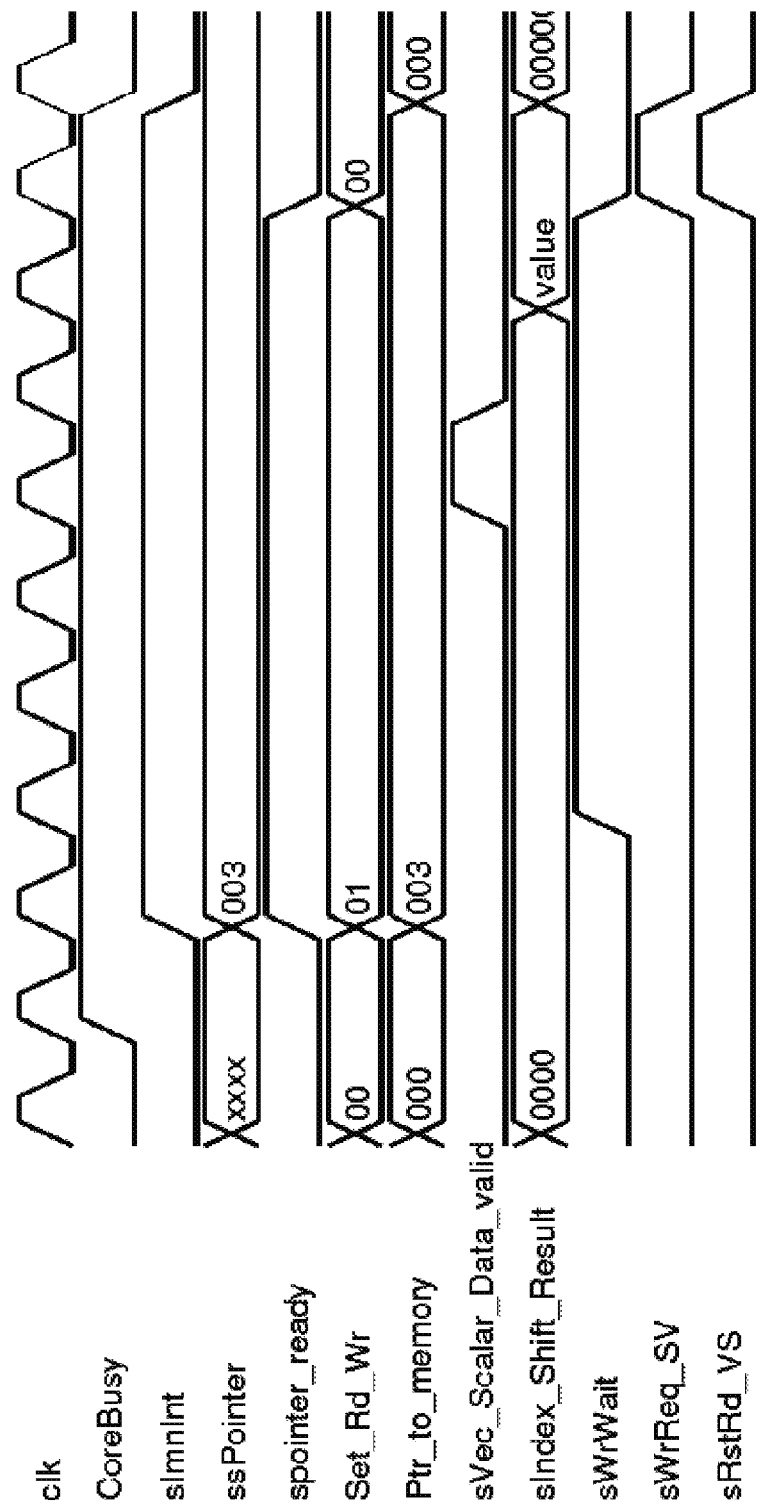
FIG. 23 shows a timing diagram corresponding to an index operation from scalar to vector in accordance with one or more embodiments of the invention.

Here we raise the signal "sRstRd_VS" with the write request although we don't read from the vector, but to reset write pointer inside the memory (requirement for the memory). Notes: 1—Port B of the destination vector will be used. 2—Because the destination is a vector, we wait if "sWr-Wait" signal is '1'. FIG. 23 shows a timing diagram corresponding to an index operation from scalar to vector in accordance with one or more embodiments of the invention.

Streaming Vector Registers Up and Down

In one or more embodiments of the invention, the vector registers (105A, 105B, 105C) may be streamed (read or write) in both directions: up to down or down to up. The direction is configured in the runtime with the instruction execution. This implies an operation like A(n−i)=B(i)+C(n−i) where n is the number of elements. In one or more embodiments of the invention, two independent read operations can occur on the two memory ports where the streaming direction for each port is independent of the other. For example the two operations A(n−i)=B(i)+C(n−i) and D(i)=B(i)+C(i) that can occur simultaneously where the vector register C is streamed up down in one operation and in the reverse direction in the other operation.

As discussed above, shifting up and down is an example of streaming vectors up and/or down. In other words, shifting is one application of streaming direction flexibility. In a shift up operation the two ports are configured at the same clock cycle with a relative start address representing the shift amount. The two ports then are streamed up to down. In a shift down operation the same happens but the two ports are streamed from down to up. The two ports are configured at the same clock cycle for a shift operation or any other operation where the vector will be the destination and the source or one of the sources.

Figure 24:
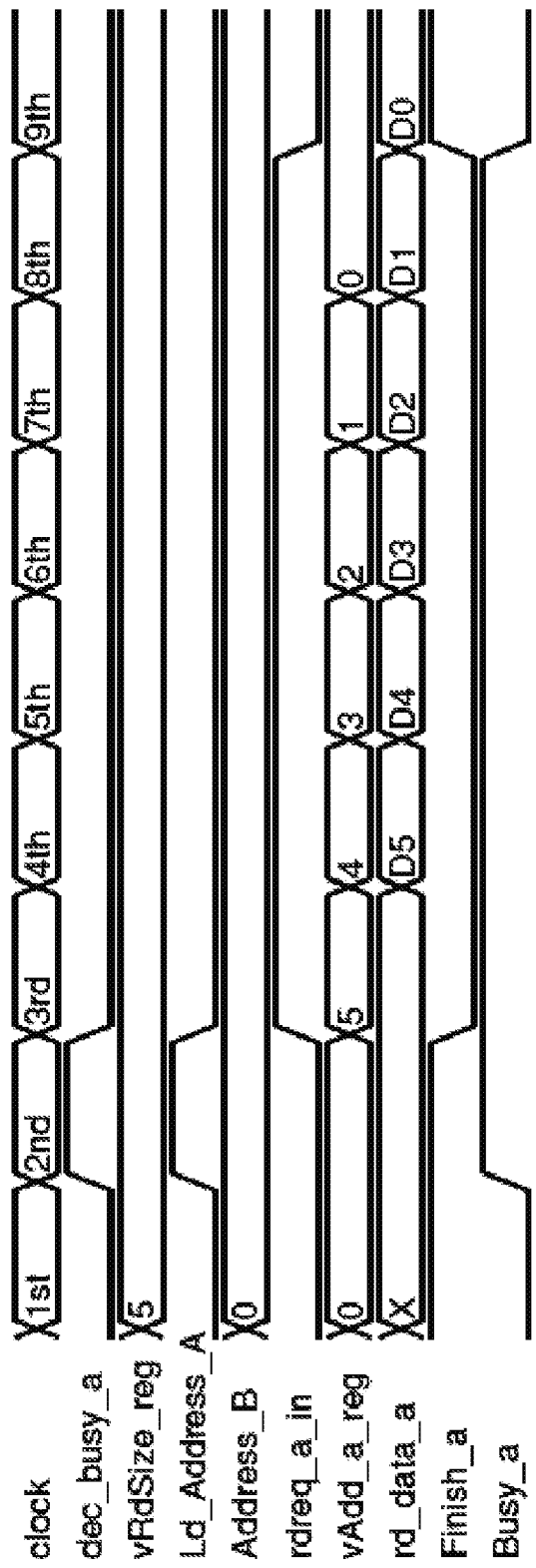
FIG. 24 shows a timing diagram corresponding to the configuration of port A for reading down to up in accordance with one or more embodiments of the invention.

In other operations where a single port is configured at a time, the same control signals can be used to configure the port to stream up or down. FIG. 24 shows a timing diagram corresponding to the configuration of port A for reading down to up in accordance with one or more embodiments of the invention. At the configuration cycle, the input Ld_Address_A and Dec_Busy_A are high which means port A is configured for read down. At the configuration cycle if Address B is not equal to zero then the initial pointer value is set by the execution unit. In this example, the initial value is zero, hence the vector will be streamed down to up starting from the last stored element.

Figure 25:
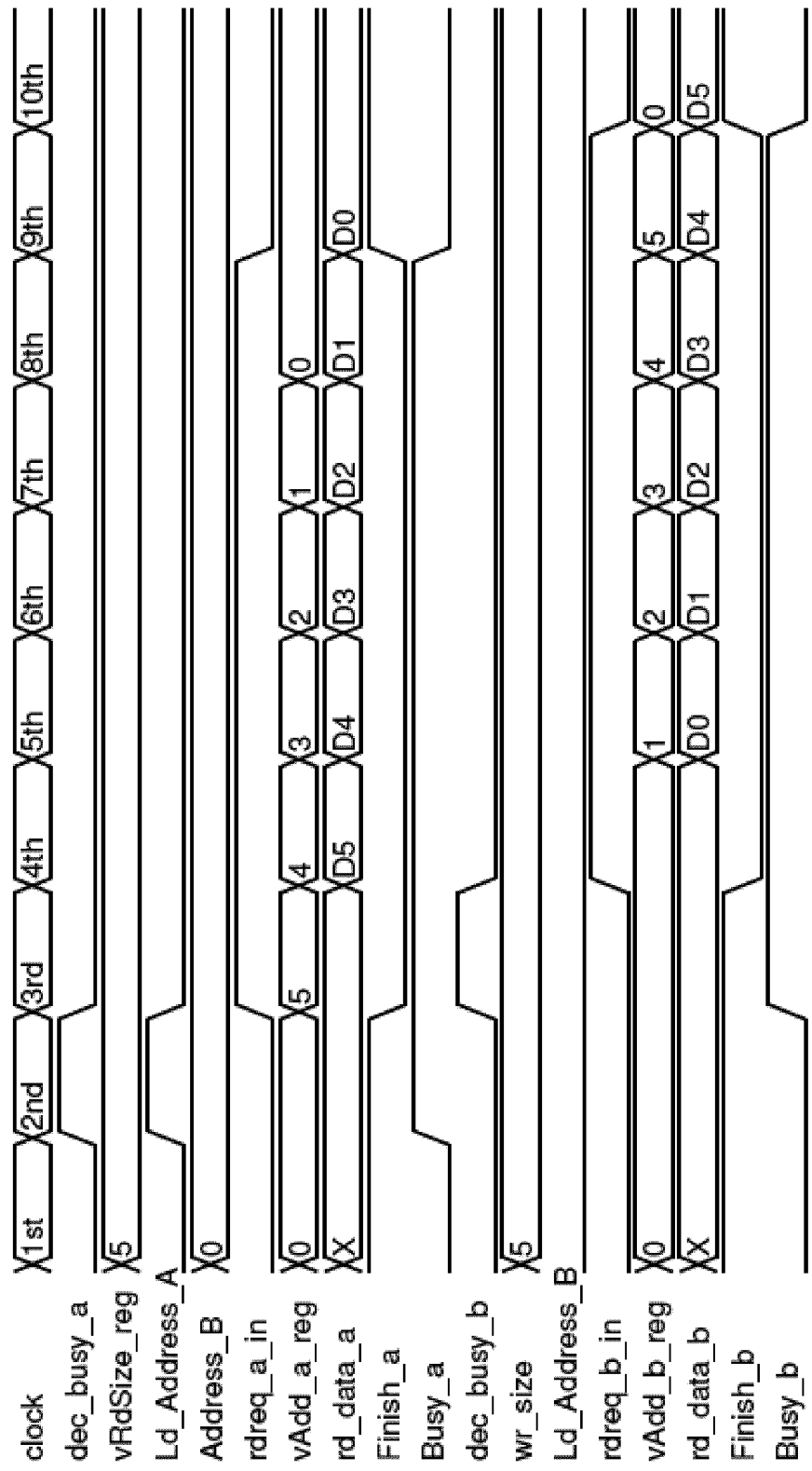
FIG. 25 show a timing diagram corresponding to the two ports of a vector register being configured to read in opposite directions in accordance with one or more embodiments of the invention.

FIG. 25 shows a timing diagram corresponding to the two ports of a vector register being configured to read in opposite directions. Port A is configured for reading down to up in the 2nd cycle. Port B is configured for reading up to down in the 3rd, Dec_Busy_b is high while Ld_Address_B is low indicating an up to down streaming direction. Because it's not a WAR state and the two ports were initially idle, the size for the two ports is the same (vRdSize _reg for port A is equal to wr_size for port B).

Figure 26:
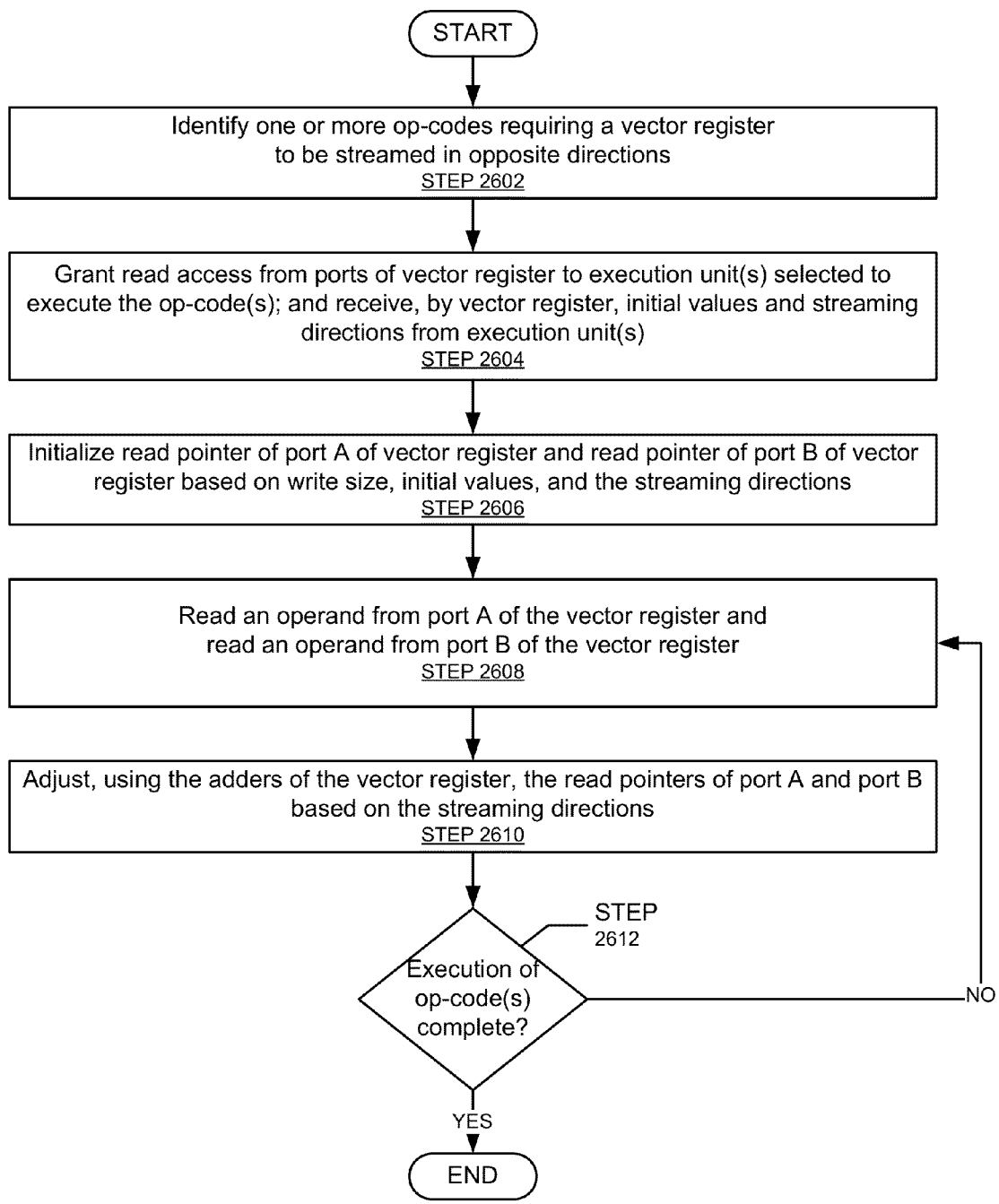
FIG. 26 shows a flowchart in accordance with one or more embodiments of the invention.

FIG. 26 shows a flowchart in accordance with one or more embodiments of the invention. The process in FIG. 26 corresponds to a method of operating a DFP processor with respect to one or more execution units reading from the ports of a vector register in opposite directions. The process described in FIG. 26 may be executed using one or more components discussed above in reference to FIG. 1 and FIG. 2 (e.g., vector register (220), execution units (110A, 110B, 110C, 112A, 112B), length register (238), etc.). One or more steps shown in FIG. 26 may be omitted, repeated, and/or performed in a different order among different embodiments of the invention. Accordingly, embodiments of the invention should not be considered limited to the specific number and arrangement of steps shown in FIG. 26.

Initially, one or more op-codes requiring a vector register to be streamed in opposite directions are identified (STEP 2602). The one or more op-codes may be identified by the decoder. The decoder may select one or more execution units for execution of the op-code(s).

In STEP 2604, the execution unit(s) selected to execute the op-code(s) are granted read access to the ports of the vector register. Moreover, the vector register receives initial values and streaming directions from the execution units.

In STEP 2606, the read pointers of the ports (i.e., port A and port B) are initialized based on at least one of the write size (i.e., stored in the length register), the initial values, and the streaming directions. For example, in the case of streaming down to up, a read pointer may initially be set to the write size. In the case of streaming up to down, a read pointer may initially be set to 0 (i.e., first element). As yet another example, an initial value received by the vector register may specify a starting address in the vector register to be read.

In STEP 2608, a DFP operand is read out from port A of the vector register and a DFP operand is read out from port B of the vector register. Specifically, the DFP operands are read out in response to read requests issued by the execution units. The multiple execution units reading from the ports may issue read requests at different rates.

In STEP 2610, the read pointers of the ports are adjusted in response to the read requests. Specifically, if a port is being streamed up to down, the read pointer for the port is incremented in response to a read request. If a port is being streamed down to up, the read pointer for the port is decremented in response to a read request.

In STEP 2612, it is determined whether execution of the op-codes is complete. In one or more embodiments of the invention, in the case of streaming down to up, execution is complete when the read pointer for the port equals zero. In one or more embodiments of the invention, in the case of streaming up to down, execution is complete when the read pointer for the port equals the write size (i.e., stored in the length register associated with the vector register). When it is determined that execution of the op-codes is complete, the process ends. Otherwise, the process returns to STEP 2608.

Streaming from multiple vector registers with different sizes

One or more embodiments of the invention include the ability to start streaming from two or more vectors that have different sizes. In such embodiments, the execution unit detects first finish flag from the shorter vector and resets the longer vector to the idle state.

Figure 27:
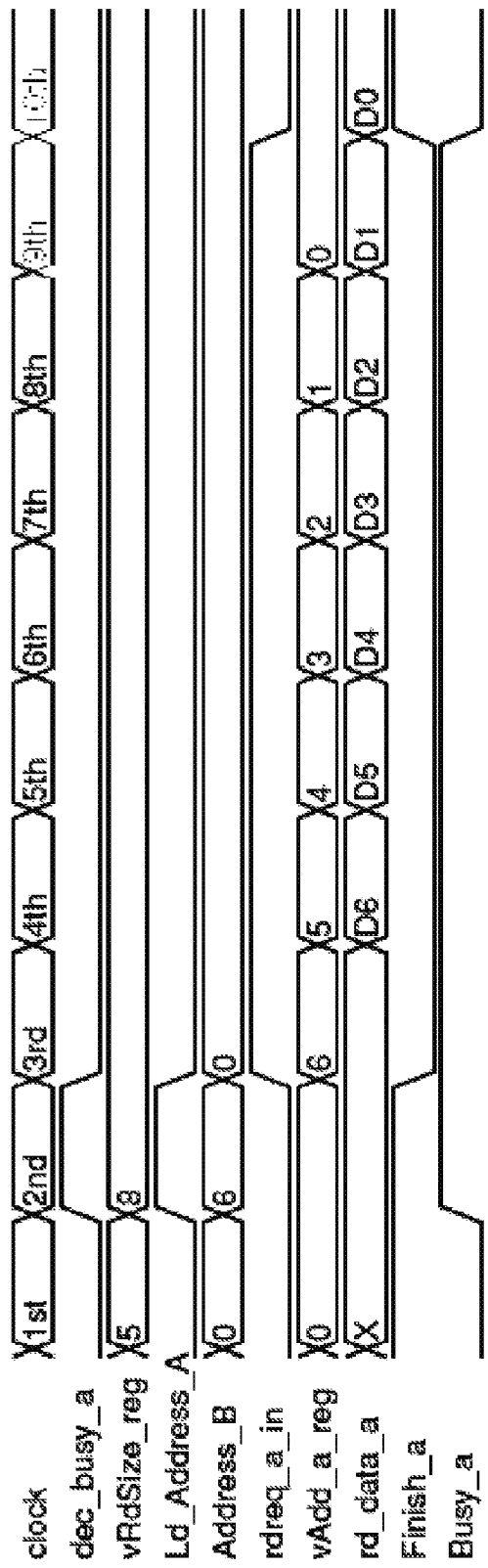
FIG. 27 shows a timing diagram corresponding to the assertion of a finish flag when a port pointer equals zero in accordance with one or more embodiments of the invention.

In one or more embodiments of the invention, when a start address is given at the configuration cycle to a vector register port, the read or write finish is decided according to the streaming direction. In case of streaming down to up, the finish flag is asserted when the pointer equals zero, as shown in FIG. 24. The pointer is decremented starting from the initial value delivered to the vector register at the configuration cycle until it reaches zero. FIG. 27 shows a timing diagram corresponding to this scenario.

In case of streaming up to down, the pointer is incremented starting from the initial value until it matches the size register and hence a finish flag is asserted. In the same way the pointer of the other read/write port can be initialized by Address_B and the streaming direction is set using Ld_Address_B.

As discussed above, the final pointer value is zero in case of streaming down to up and it's the size of the vector in case of streaming up to down. In one or more embodiments of the invention, the initial and final values of the vector window could be configured. The initial value of the address is configured as explained above and the final pointer value is configured after configuring the initial address by 2 clock cycles. This puts a very basic constraint that the needed operand window to be at least two operands.

Reading or writing a single operand is implemented under the index instructions.

Figure 28:
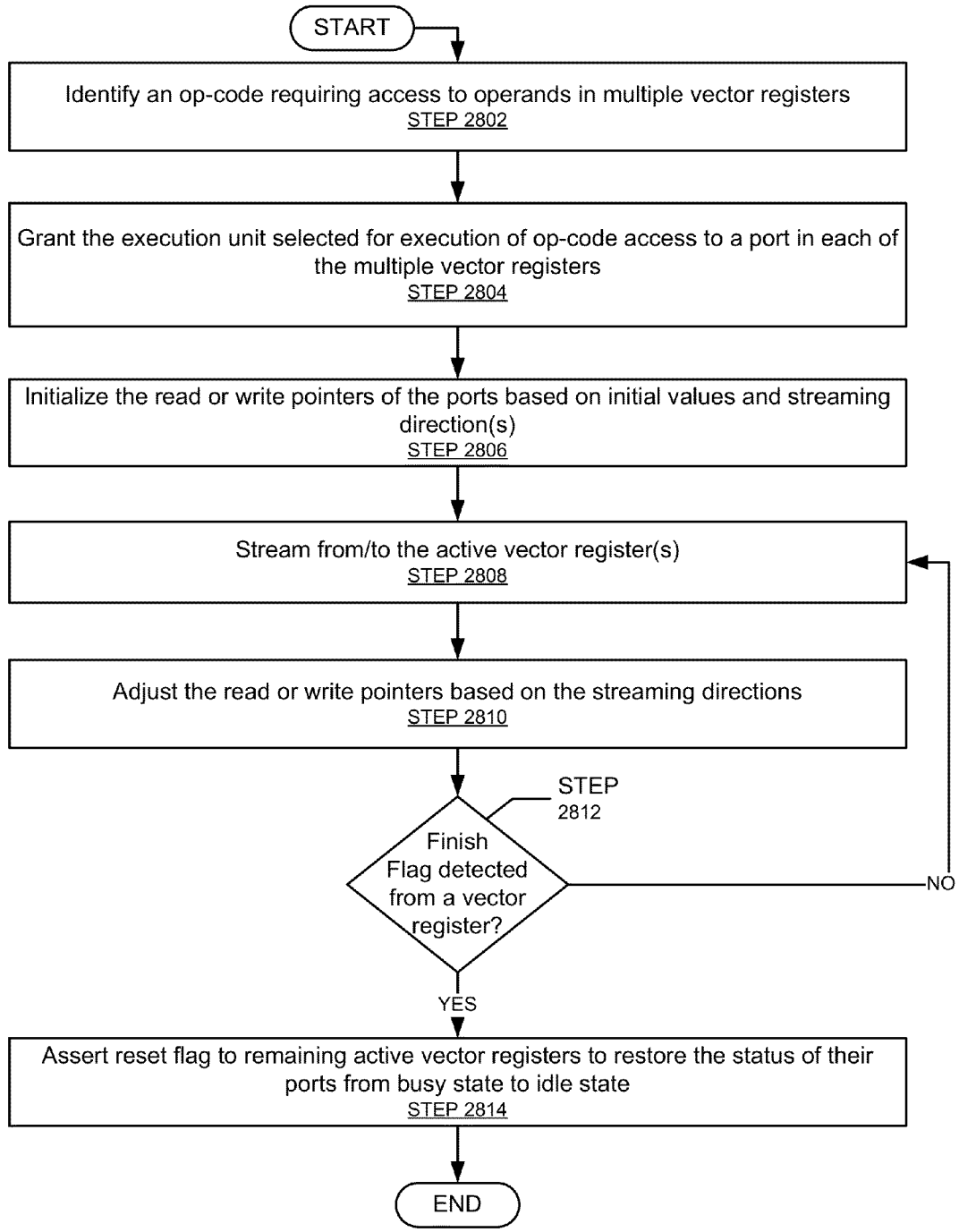
FIG. 28 shows a flowchart in accordance with one or more embodiments of the invention.

FIG. 28 shows a flowchart in accordance with one or more embodiments of the invention. The process in FIG. 28 corresponds to a method of operating a DFP processor with respect to streaming from multiple vector registers with different sizes. The process described in FIG. 28 may be executed using one or more components discussed above in reference to FIG. 1 and FIG. 2 (e.g., vector register (220), execution units (110A, 110B, 110C, 112A, 112B), length register (238), etc.). One or more steps shown in FIG. 28 may be omitted, repeated, and/or performed in a different order among different embodiments of the invention. Accordingly, embodiments of the invention should not be considered limited to the specific number and arrangement of steps shown in FIG. 28.

Initially, an op-code requiring access to DFP operands in multiple vector registers is identified by a decoder (STEP 2802). The decoder may select an execution unit to execute the op-code. Some of the vector registers store more DFP operands than are needed by the op-code.

In STEP 2804, the execution unit selected to execute the op-code is granted access to a port in each of the multiple vector registers. Moreover, each of the multiple vector registers may receive an initial value (i.e., start address) and a streaming direction.

In STEP 2806, the pointers (i.e., read pointer or write pointer) of the ports are initialized based on the initial value (i.e., starting address) and streaming direction. For example, the pointer of a vector register port may be set at 0, the pointer may be set at the write size of the vector register, or the pointer may be set at the stating address received by the vector register.

In STEP 2808, DFP operands are read from and/or written to the ports of the multiple vector registers. In other words, the execution unit selected to execute the op-code may be issuing read requests and/or write requests to the ports of the multiple vector registers.

In STEP 2810, the pointers (i.e., read pointer, write pointer) of the ports are adjusted in response to the read requests and/or write requests and the streaming direction(s). In the case of streaming down to up, the pointers are decremented. In the case of streaming up to down, the pointers are incremented.

In STEP 2812, it is determined whether a finish flag from one of the multiple vector registers has been received by the execution unit. The finish flag may be issued with the pointer of the vector register reaches zero (i.e., streaming down to up) or the write size of the vector register (i.e., streaming up to down) When it is determined that the finish flag has been received, the process proceeds to STEP 2814. Otherwise, the process returns to STEP 2808.

In STEP 2814, the execution unit asserts the reset flag to the remaining active vector registers to restore the status of their ports from busy state to idle state. Those skilled in the art, having the benefit of this detailed disclosure, will appreciate that these remaining active vector registers may be longer (i.e., store more DFP operands) than the vector register that set the finish flag in STEP 2812. Moreover, these remaining active vector registers may have additional DFP operands that are not needed for successful execution of the op-code.

Vector is a Source and Destination

Similar to the shift operation where read and write access are granted to the ISE unit, the same could be done with other examples of operations. For example the operation A(i)=A(i)+B(i) to be executed, the decode stage give the adder both read and write access to vector register A. At the instant X the adder (or any other execution unit) reads the operand i from the vector A, adds to it the elements i in vector register B. At the instant X+m the ith element of vector register is overwritten by the addition result. Where m is a positive integer equals the latency of the adder unit.

Clearly the read and write operations on vector A should be both up-down or down-up. On the other hand read/write direction on vector A could be different from reading direction on port B.

The property of reading different windows from vector A and vector B where they have different sizes is still applicable on this operation.

Multiple read operations after WAR with different sizes

While a first execution unit is reading from port A of vector register X, a write access grant is given to a second execution unit. The old size is copied to the read register and the second execution unit then updates the length register with the new size.

Assume, for example, the first execution unit is power function and second execution unit is a copy. Assuming the size copied to read size register was 100 operands and the new size set in the length register is 20. Respecting the write wait flags at the copy execution unit side, the copy execution unit finishes its operation once it writes the 20th element to the vector register X. The write port (port B) now is restored to idle state. The decode stage then given read access grant to third execution unit to read from port B. The read operation on port B will be ended when the read pointer of port B matches the value 20 stored in the length register.

According to above discussion, multiple read operations with different streaming directions can be operational on port B while the read operation on port A is still running. This is an add-on (or special case) to reading from the two ports with different directions which occurs after WAR state while the read from first execution unit has not been finished yet. In other words, after WAR state where a write operation has ended and the first read operation still running, the first read operation still operating on the old size, while the second port sees the new size. Until the moment that the first read operation is ended, multiple read access grants could be given on the second port operation with the new size. Those operations could be configured in either streaming directions.

A second write operation could be granted after first write operation and those multiple read operations while read from first port is still running. The first port holds its state and size until the first execution unit finishes the streaming operation.

This situations are caused due to speed difference between different execution units. For our example, we assumed first execution unit to be power as the power unit takes about 40 clock cycles to process one operand so, it will take 4000 cycles to operate on the whole 100 operands. Unlike a pipelined add operation that will take 100+m cycles to operate on the 100 elements where m is a positive integer representing the add initial latency due to pipeline registers.

Controls for Initialization of Pointers

In one or more embodiments of the invention, setting the mode of operation of the vector register is done via three controls Ld_Address_A and Ld_Address_B and Shift_Index_2Mem which gives only eight combinations of possible operations set by these three input. Within the description it's obvious that the modes of operation of the memory are more than 8. Still all of them set by the three controls Ld_Address_A and Ld_Address_B and Shift_Index_2Mem. The architecture of the vector register benefits from a time-division-multiplexing-like behavior. The same binary combination of the three controls has a different meaning according to the time slot they are set within.

The value of the two controls in different time slots comprise:

1. Set initial pointer value. (read and/or write). (possible 3 actions)
2. Set end pointer value. (read and/or write). (possible 3 actions)
3. Determine an index operation from port A or port B. (vector to scalar) (single action)
4. Determine an index operation to port B. (single action)
5. Determine a copy under condition state. (single action).
6. Determine shift up/down. (two actions).
7. Define streaming direction for both ports (port A up/down and/or port B up/down) (8 actions)

Which sum up into 19 different actions using the three signals versus original 8 possible actions.

All described actions/processes are applicable on both DFP data types and integer data types. One or more embodiments of the invention provides these functionalities for the two data types, integer and decimal float.

The system(s) and processes described in this detailed description may be used in any application requiring decimal calculations, including (but not limited to) applications of: finance, taxation, investments, transportation, commerce, energy consumption, energy pricing/purchasing, etc.

Figure 29:
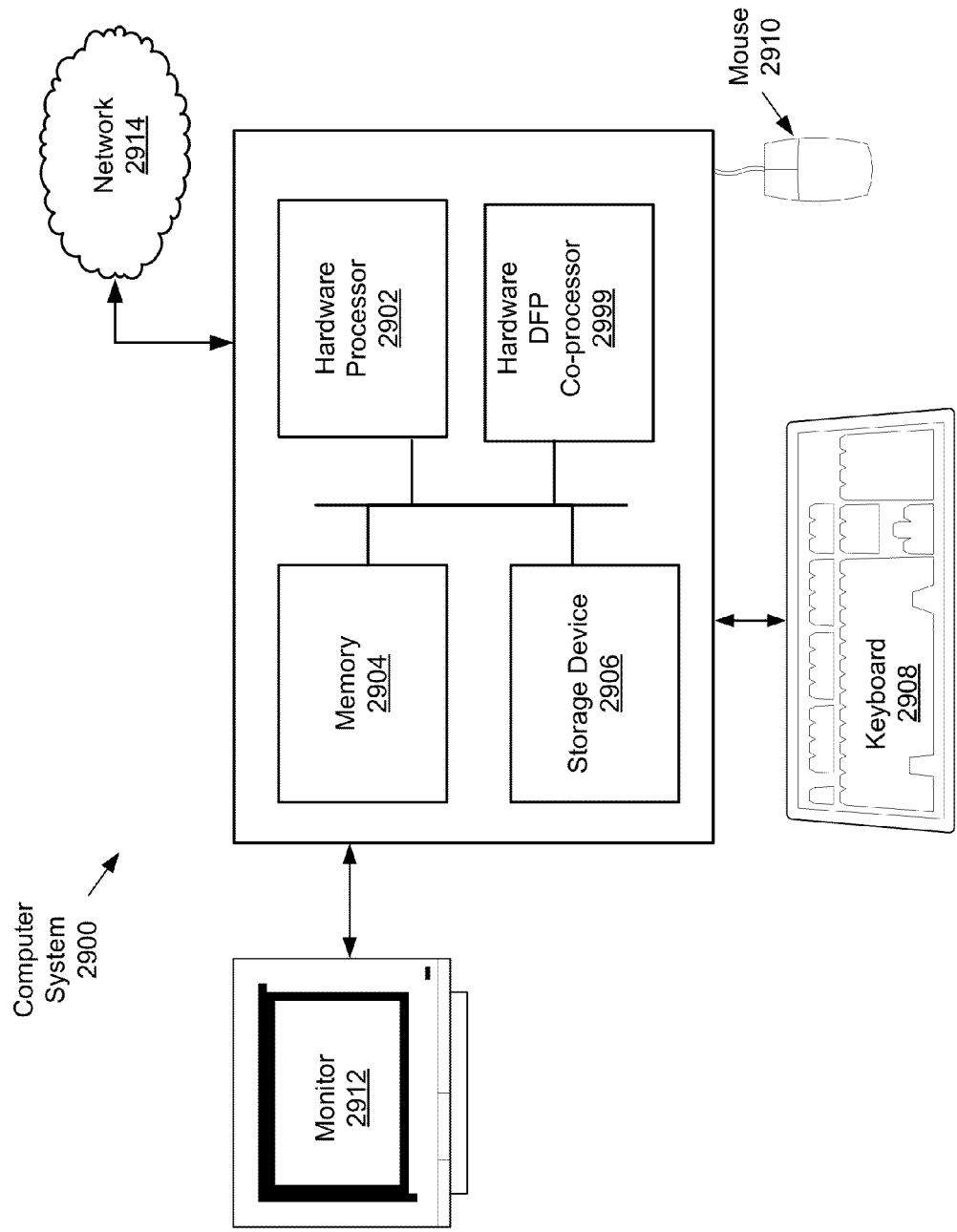
FIG. 29 shows a computer system in accordance with one or more embodiments of the invention.

Embodiments of the invention may be implemented on virtually any type of computer regardless of the platform being used. For example, as shown in FIG. 29, a computer system (2900) includes one or more processor(s) (2902) (such as a central processing unit (CPU), integrated circuit, etc.), a DFP co-processor (2999), associated memory (2904) (e.g., random access memory (RAM), cache memory, flash memory, etc.), a storage device (2906) (e.g., a hard disk, an optical drive such as a compact disk drive or digital video disk (DVD) drive, a flash memory stick, etc.), and numerous other elements and functionalities typical of today's computers (not shown). The DFP co-processor (2999) may correspond to DFP Processor (100) (discussed above in reference to FIG. 1). The computer system (2900) may also include input means, such as a keyboard (2908), a mouse (2910), or a microphone (not shown). Further, the computer system (2900) may include output means, such as a monitor (2912) (e.g., a liquid crystal display (LCD), a plasma display, or cathode ray tube (CRT) monitor). The computer system (2900) may be connected to a network (2914) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (2900) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a solid state memory device, a tape, memory, or any other non-transitory tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a decimal-floating point (DFP) processor, comprising:
    identifying a first op-code requiring read access to a first plurality of DFP operands in a vector register of the DFP processor;
    granting read access from a first port of the vector register to a first execution unit of the DFP processor selected to execute the first op-code;
    initializing a read pointer of the first port;
    reading out, from the first port and based on the read pointer, a first DFP operand of the plurality of DFP operands in response to a read request from the first execution unit, wherein the first DFP operand is represented as a DFP data type;
    adjusting the read pointer of the first port in response to reading out the first DFP operand;
    identifying, during execution of the first op-code, a second op-code configured to write a second plurality of DFP operands to the vector register, wherein the first plurality of DFP operands has a first size, wherein the second plurality of DFP operands has a second size, and wherein the first size and the second size are different;

granting, during execution of the first op-code, a second execution unit of the DFP processor selected to execute the second op-code write access to a second port of the vector register;

storing, in response to granting write access, the first size in a read size register of the vector register and storing the second size in a length register;

initializing a write pointer of the second port;

writing, based on the write pointer and during execution of the first op-code, a second DFP operand of the second plurality of DFP operands to the vector register via the second port in response to a write request from the second execution unit;

adjusting the write pointer of the second port in response to writing the second DFP operand;

setting, by the vector register and in response to the write pointer equaling the read pointer, a write wait flag to prevent overwriting of at least one of the first plurality of DFP operands in the vector register; and halting, by the second execution unit, write requests based on the write wait flag.

2. The method of claim 1, further comprising:

setting a write end flag in response to the write pointer equaling the second size stored in the length register; and setting a read end flag in response to the read pointer equaling the first size stored in the read size register.

3. The method of claim 1, wherein the first execution unit is a DFP divider, and wherein the second execution unit is a DFP adder.

4. A method for operating a DFP processor, comprising:

identifying a first op-code requiring read access to a first plurality of DFP operands in a vector register of the DFP processor;

granting read access from a first port of the vector register to a first execution unit of the DFP processor selected to execute the first op-code;

initializing a read pointer of the first port;

reading out, from the first port and based on the read pointer, a first DFP operand of the plurality of DFP operands in response to a read request from the first execution unit, wherein the first DFP operand is represented as a DFP data type;

adjusting the read pointer of the first port in response to reading out the first DFP operand;

granting, in response to the first op-code being a shift operation, the first execution unit write access to a second port of the vector register, wherein the first execution unit is an index & shift execution unit;

receiving, by the vector register and before the read request, a shift amount and a shift direction;

initializing a write pointer of the second port based on at least the shift direction;

writing, after the read request and based on the write pointer, the first DFP operand to the vector register via the second port in response to a write request from the first execution unit; and adjusting the write pointer in response to the write request.

5. The method of claim 4, wherein initializing the read pointer comprising:

setting the read pointer to a difference between a size stored in a length register and the shift amount, wherein the shift direction is down, and wherein adjusting the read pointer comprises decrementing the read pointer.

6. The method of claim 4, wherein initializing the read pointer comprises:

setting the read pointer to the shift amount, wherein the shift direction is up, and wherein adjusting the read pointer comprises incrementing the read pointer.

7. A method for operating a DFP processor, comprising:

identifying a first op-code requiring read access to a first plurality of DFP operands in a vector register of the DFP processor;

granting read access from a first port of the vector register to a first execution unit of the DFP processor selected to execute the first op-code;

initializing a read pointer of the first port;

reading out, from the first port and based on the read pointer, a first DFP operand of the plurality of DFP operands in response to a read request from the first execution unit, wherein the first DFP operand is represented as a DFP data type;

adjusting the read pointer of the first port in response to reading out the first DFP operand;

identifying a second op-code requiring read access to the first plurality of DFP operands, wherein the first op-code and the second op-code read the first plurality of DFP operands in opposite streaming directions;

granting, during execution of the first op-code, a second execution unit of the DFP processor selected to executed the second op-code read access to a second port of the vector register;

initializing, during execution of the first op-code, a read pointer of the second port;

reading out, from the second port, a second DFP operand of the first plurality of operands in response to a read request from the second execution unit; and adjusting the read pointer of the second port.

8. The method of claim 7, wherein adjusting the read pointer of the second port comprises decrementing the read pointer of the second port, and wherein adjusting the read pointer of the first port comprises incrementing the read pointer of the first port.

9. A method for operating a decimal floating-point (DFP) processor, comprising:

identifying an op-code requiring access to a first plurality of DFP operands in a first vector register and a second plurality of DFP operands in a second vector register, wherein the first plurality of DFP operands and the a second plurality of DFP operands have different sizes;

granting an execution unit of the DFP processor selected to execute the op-code access to a first port of the first vector register and a second port of the second vector register;

initialize a first pointer of the first port and a second pointer of the second port;

streaming the first vector register and the second vector register;

adjusting, in response to streaming, the first pointer and the second pointer;

setting, by the first vector register, a finish flag; and setting, by the execution unit and in response to the finish flag, a reset flag to restore the second vector register from a busy state to an idle state.

10. The method of claim 9, wherein the first vector register and the second vector register are streamed in opposite directions.

11. The method of claim 9, wherein the execution unit is a FMA unit.

12. A DFP processor comprising:
a memory bank comprising a vector register and a scalar register;
a plurality of execution units comprising:
a first execution unit configured to:
identify a first op-code requiring read access to a first plurality of DFP operands in the vector register;
obtain read access from a first port of the vector register to execute the first op-code;
initialize a read pointer of the first port;
read out, from the first port and based on the read pointer, a first DFP operand of the plurality of DFP operands in response to a read request, wherein the first DFP operand is represented as a DFP data type; and
adjust the read pointer of the first port in response to reading out the first DFP operand; and
a second execution unit configured to:
identify, during execution of the first op-code, a second op-code configured to write a second plurality of DFP operands to the vector register,
wherein the first plurality of DFP operands has a first size, wherein the second plurality of DFP operands has a second size, and wherein the first size and the second size are different;
obtain, during execution of the first op-code, write access to a second port of the vector register;
store, in response to obtaining write access, the first size in a read size register of the vector register and store the second size in a length register;
initialize a write pointer of the second port;
write, based on the write pointer and during execution of the first op-code, a second DFP operand of the second plurality of DFP operands to the vector register via the second port in response to a write request from the second execution unit;
adjust the write pointer of the second port in response to writing the second DFP operand;
set, by the vector register and in response to the write pointer equaling the read pointer, a write wait flag to prevent overwriting of at least one of the first plurality of DFP operands in the vector register; and
halt write requests based on the write wait flag;
a plurality of configurable operand buses operatively connecting the memory bank and the plurality of execution units; and
a plurality of result buses operatively connecting the plurality of execution units and the memory bank.

13. A DFP processor comprising:
a memory bank comprising a vector register and a scalar register;
a plurality of execution units comprising an index & shift execution unit configured to:
identify a first op-code requiring read access to a first plurality of DFP operands in the vector register;
obtain read access from a first port of the vector register to execute the first op-code;
initialize a read pointer of the first port;
read out, from the first port and based on the read pointer, a first DFP operand of the plurality of DFP operands in response to a read request, wherein the first DFP operand is represented as a DFP data type; and
adjust the read pointer of the first port in response to reading out the first DFP operand;
obtain, in response to the first op-code being a shift operation, write access to a second port of the vector register;
receive, by the vector register and before the read request, a shift amount and a shift direction;
initialize a write pointer of the second port based on at least the shift direction;
write, after the read request and based on the write pointer, the first DFP operand to the vector register via the second port in response to a write request from the first execution unit; and
adjust the write pointer in response to the write request;
a plurality of configurable operand buses operatively connecting the memory bank and the plurality of execution units; and
a plurality of result buses operatively connecting the plurality of execution units and the memory bank.

14. A DFP processor comprising:
a memory bank comprising a vector register and a scalar register;
a plurality of execution units comprising:
a first execution unit configured to:
identify a first op-code requiring read access to a first plurality of DFP operands in the vector register;
obtain read access from a first port of the vector register to execute the first op-code;
initialize a read pointer of the first port;
read out, from the first port and based on the read pointer, a first DFP operand of the plurality of DFP operands in response to a read request, wherein the first DFP operand is represented as a DFP data type; and
adjust the read pointer of the first port in response to reading out the first DFP operand; and
a second execution unit configured to:
identify a second op-code requiring read access to the first plurality of DFP operands,
wherein the first op-code and the second op-code read the first plurality of DFP operands in opposite streaming directions;
obtain, during execution of the first op-code, read access to a second port of the vector register;
initialize, during execution of the first op-code, a read pointer of the second port;
read out, from the second port, a second DFP operand of the first plurality of operands in response to a read request from the second execution unit; and
adjust the read pointer of the second port;
a plurality of configurable operand buses operatively connecting the memory bank and the plurality of execution units; and
a plurality of result buses operatively connecting the plurality of execution units and the memory bank.

* * * * *